(12) United States Patent
Sugiyama

(10) Patent No.: US 10,189,471 B2
(45) Date of Patent: Jan. 29, 2019

(54) SHOVEL AND SHOVEL CONTROL METHOD

(71) Applicant: SUMITOMO HEAVY INDUSTRIES, LTD., Tokyo (JP)

(72) Inventor: Yuta Sugiyama, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/477,411

(22) Filed: Apr. 3, 2017

(65) Prior Publication Data

US 2017/0203755 A1    Jul. 20, 2017

Related U.S. Application Data

(63) Continuation of application No. PCT/JP2015/084203, filed on Dec. 4, 2015.

(30) Foreign Application Priority Data

Dec. 5, 2014    (JP) .................................. 2014-246388

(51) Int. Cl.
*B60W 20/50*    (2016.01)
*B60L 11/02*    (2006.01)
(Continued)

(52) U.S. Cl.
CPC .............. *B60W 20/50* (2013.01); *B60L 11/02* (2013.01); *B60W 10/06* (2013.01); *B60W 10/08* (2013.01);
(Continued)

(58) Field of Classification Search
CPC ...... F01N 11/00; F01N 11/002; F01N 11/007; F01N 3/10; F01N 3/00; F01N 9/00
See application file for complete search history.

(56) References Cited

U.S. PATENT DOCUMENTS

| | | |
|---|---|---|
| 2010/0139255 A1 | 6/2010 | Kamiya et al. |
| 2011/0251746 A1 | 10/2011 | Wu et al. |
| 2014/0116031 A1 | 5/2014 | Yoshida et al. |

FOREIGN PATENT DOCUMENTS

| | | |
|---|---|---|
| EP | 2151528 | 2/2010 |
| EP | 2353956 | 8/2011 |

(Continued)

OTHER PUBLICATIONS

International Search Report for PCT/JP2015/084203 dated Feb. 16, 2016.

*Primary Examiner* — James A Shriver, II
*Assistant Examiner* — James J Triggs
(74) *Attorney, Agent, or Firm* — IPUSA, PLLC

(57) ABSTRACT

A shovel is provided that includes a lower running body, an upper turning body pivotally mounted on the lower running body, an engine mounted on the upper turning body, a motor generator driven by the engine, a power storage device for storing electric power generated by the motor generator, an electric motor for supplying regenerative electric power to the power storage device, a selective reduction catalyst system for purifying exhaust gas by injecting a reducing agent stored in a reducing agent storage tank into an exhaust pipe of the engine, an abnormality detection unit for detecting an abnormality of the selective reduction catalyst system, and a control device that performs abnormality determination on the selective reduction catalyst system based on a detection result of the abnormality detection unit. The control device continues to control the electric motor before and after the abnormality determination.

15 Claims, 14 Drawing Sheets

(51) Int. Cl.
   *B60W 10/06*   (2006.01)
   *B60W 10/08*   (2006.01)
   *E02F 9/08*    (2006.01)
   *E02F 9/20*    (2006.01)
   *E02F 9/22*    (2006.01)
   *F01N 3/20*    (2006.01)
   *F01N 11/00*   (2006.01)
   *E02F 3/32*    (2006.01)

(52) U.S. Cl.
   CPC .......... *E02F 9/0866* (2013.01); *E02F 9/0883* (2013.01); *E02F 9/207* (2013.01); *E02F 9/2066* (2013.01); *E02F 9/2075* (2013.01); *E02F 9/2091* (2013.01); *E02F 9/226* (2013.01); *E02F 9/2246* (2013.01); *E02F 9/2271* (2013.01); *F01N 3/208* (2013.01); *F01N 11/00* (2013.01); *F01N 11/007* (2013.01); *B60W 2300/17* (2013.01); *B60W 2530/12* (2013.01); *B60W 2710/08* (2013.01); *B60W 2710/083* (2013.01); *E02F 3/32* (2013.01); *F01N 2550/05* (2013.01); *F01N 2590/08* (2013.01); *F01N 2590/11* (2013.01); *F01N 2610/1406* (2013.01); *F01N 2900/08* (2013.01); *F01N 2900/1806* (2013.01); *F01N 2900/1814* (2013.01); *Y02T 10/47* (2013.01); *Y10S 903/93* (2013.01)

(56) References Cited

FOREIGN PATENT DOCUMENTS

| | | |
|---|---|---|
| JP | 2008-297812 | 12/2008 |
| JP | 2010-106561 | 5/2010 |
| JP | 2010-133237 | 6/2010 |

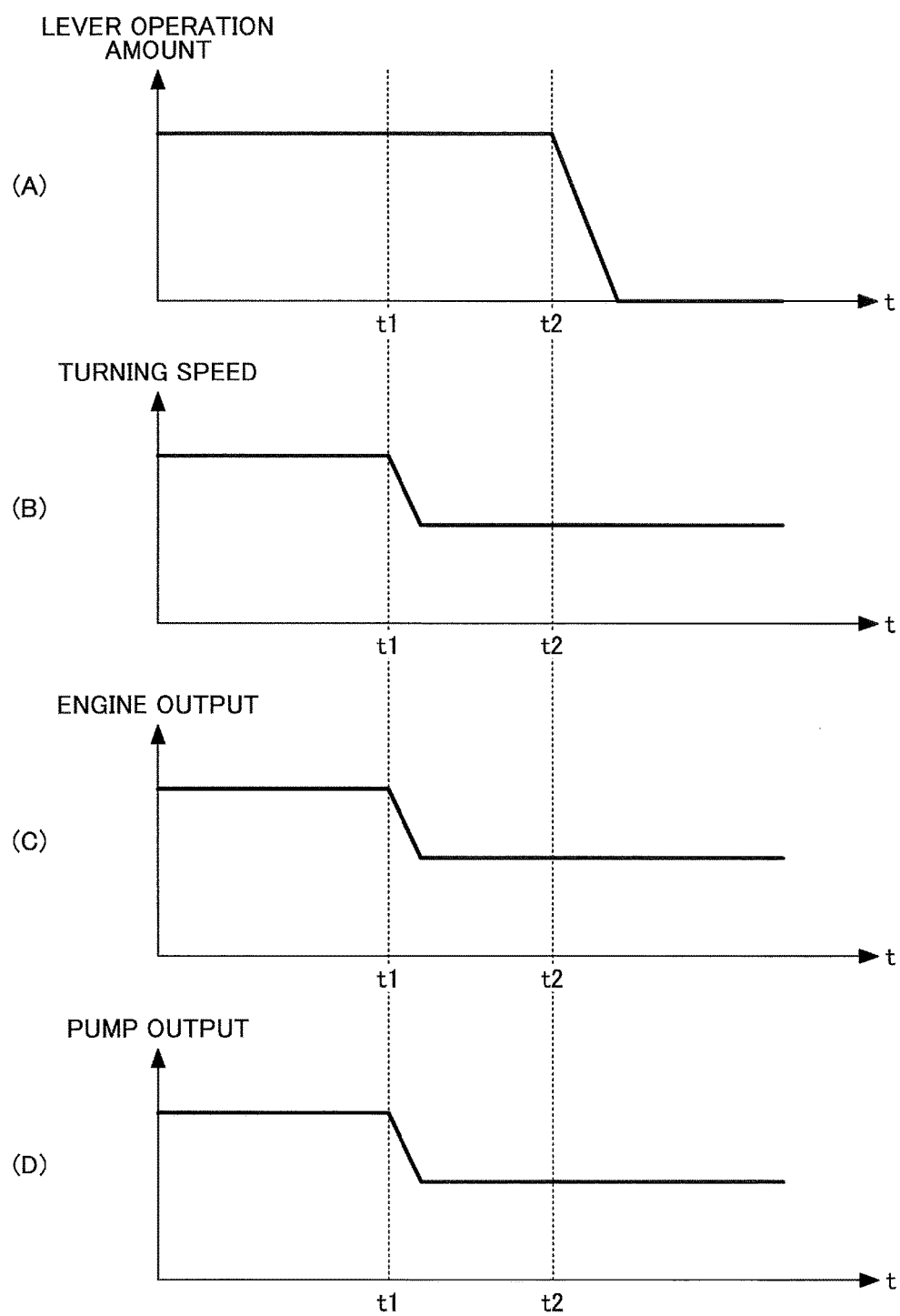

SHOVEL AND SHOVEL CONTROL METHOD

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2015/084203 filed on Dec. 4, 2015 and designating the U.S., which claims priority to Japanese Patent Application No. 2014-246388 filed on Dec. 5, 2014. The entire contents of the foregoing applications are incorporated herein by reference.

BACKGROUND OF THE INVENTION

1. Field of the Invention

The present invention relates to a shovel including a selective reduction catalyst system for reducing nitrogen oxide in exhaust gas of an engine using a reducing agent and a method for controlling such a shovel.

2. Description of the Related Art

A hybrid construction machine that stops driving a drive control system of an electric working element when an abnormality occurs in a motor generator or a drive control system of the motor generator is known.

However, conventional hybrid construction machines do not implement techniques for reducing the amount of nitrogen oxide in exhaust gas using a selective reduction catalyst system. Also, an appropriate process is not implemented upon detecting an abnormality in the selective reduction catalyst system. As such, conventional hybrid construction machines may not be able to fully comply with exhaust gas regulations. Also, when an abnormality occurs in the selective reduction catalyst system, drive operations of the drive control system of an electric working element are stopped.

In view of the above, a shovel is desired that includes a selective reduction catalyst system for reducing the amount of nitrogen oxide in exhaust gas and is capable of operating appropriately even when an abnormality occurs in the selective reduction catalyst system.

SUMMARY OF THE INVENTION

According to one embodiment of the present invention, a shovel is provided that includes a lower running body, an upper turning body pivotally mounted on the lower running body, an engine mounted on the upper turning body, a motor generator driven by the engine, a power storage device for storing electric power generated by the motor generator, an electric motor for supplying regenerative electric power to the power storage device, a selective reduction catalyst system for purifying exhaust gas by injecting a reducing agent stored in a reducing agent storage tank into an exhaust pipe of the engine, an abnormality detection unit for detecting an abnormality of the selective reduction catalyst system, and a control device that performs abnormality determination on the selective reduction catalyst system based on a detection result of the abnormality detection unit. The control device continues to control the electric motor before and after the abnormality determination.

BRIEF DESCRIPTION OF THE DRAWINGS

FIG. 12 is a time chart showing temporal transitions in the lever operation amount, the turning speed, an engine output, and a pump output when an abnormality is detected in the selective reduction catalyst system while a turning operation is being performed.

DESCRIPTION OF THE PREFERRED EMBODIMENTS

In the following, embodiments of the present invention will be described with reference to the accompanying drawings.

Figure 1:
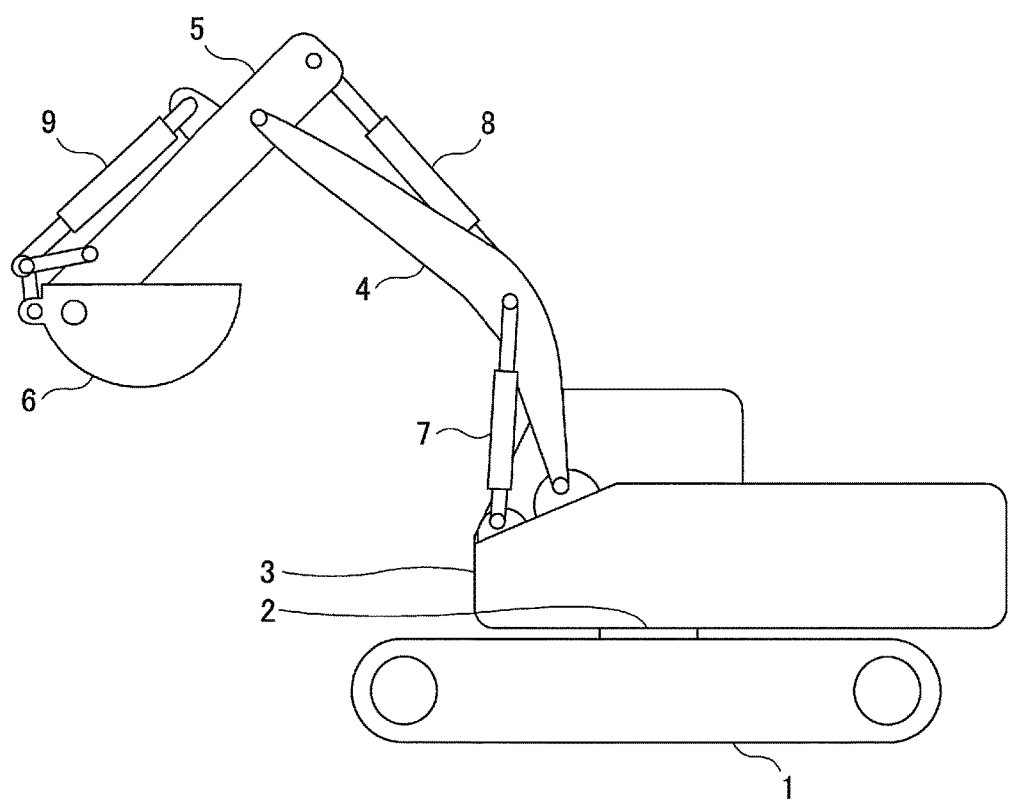
FIG. 1 is a side view of a shovel according to an embodiment of the present invention.

FIG. 1 is a side view of a shovel (excavator) as an example of a hybrid construction machine according to an embodiment of the present invention. In FIG. 1, the shovel includes a lower running body 1, a turning mechanism 2, and an upper turning body 3 that is pivotally mounted on the lower running body 1 via the turning mechanism 2. Working components including a boom 4, an arm 5, and a bucket 6 are attached to the upper turning body 3 so that they can swing in vertical directions. The working components are hydraulically driven to swing in the vertical directions by actuators including a boom cylinder 7, an arm cylinder 8, and a bucket cylinder 9.

The boom 4, the arm 5, and the bucket 6 constitute attachments for excavation (digging). Note that other attachments, such as attachments for crushing or lifting magnet attachments can also be connected to the upper truing body 3, for example.

Figure 2:
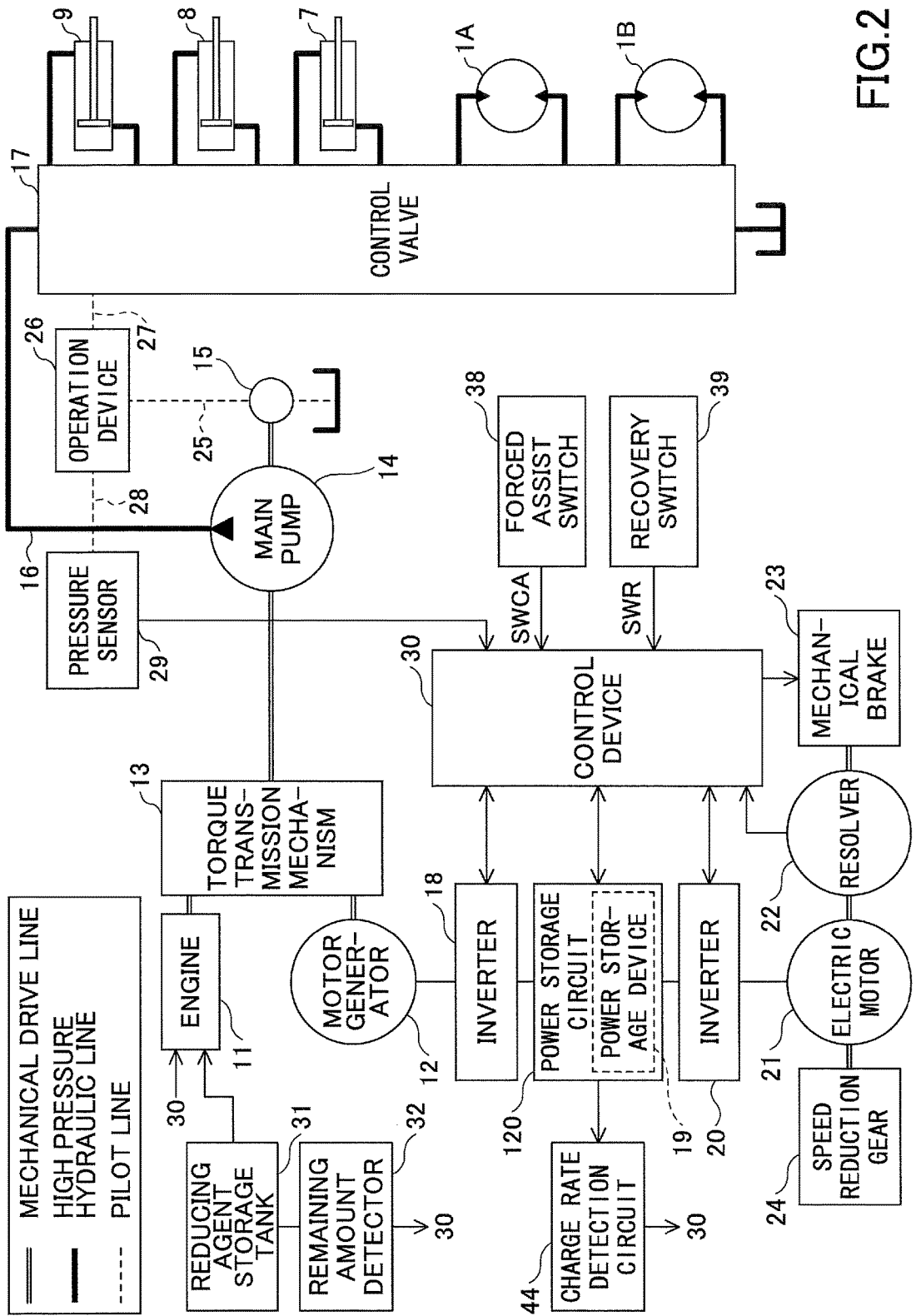
FIG. 2 is a block diagram showing an example configuration of the shovel.

FIG. 2 is a block diagram showing an example configuration of the shovel shown in FIG. 1. In FIG. 2, a mechanical power system is represented by a double line, a high pressure hydraulic line is represented by a thick solid line, and a pilot line is represented by a broken line.

A drive shaft of an engine 11 is connected to an input shaft of a torque transmission mechanism 13. Note that an internal combustion engine such as a diesel engine may be used as the engine 11. A drive shaft of a motor generator 12 is connected to another input shaft of the torque transmission mechanism 13. The motor generator 12 can perform both an assist operation and a power generating operation. A drive shaft of a main pump (hydraulic pump) 14 is connected to an output shaft of the torque transmission mechanism 13. The main pump 14 is driven by power generated by the engine 11 and power generated by the motor generator 12.

When the motor generator 12 performs the assist operation, the power generated by the motor generator 12 is transmitted to the main pump 14 via the torque transmission mechanism 13. As a result, the load applied to the engine 11 is reduced. When the motor generator 12 performs the power generating operation, the power generated by the engine 11 is transmitted to the motor generator 12 via the torque transmission mechanism 13.

The main pump 14 supplies hydraulic pressure to a control valve 17, via a high pressure hydraulic line 16. The control valve 17 distributes the hydraulic pressure to various actuators, such as a left side hydraulic motor 1A, a right side hydraulic motor 1B, the boom cylinder 7, the arm cylinder 8, and the bucket cylinder 9, for example, in response to a command from a driver. The hydraulic motor 1A for the left side and the hydraulic motor 1B for the right side respectively drive two crawlers provided at the left side and right side of the lower running body 1.

While the motor generator 12 is performing the assist operation, required electric power is supplied from a power storage circuit 120 to the motor generator 12 via an inverter 18 corresponding to a drive control unit. While the motor generator 12 is performing the power generating operation, the power generated by the motor generator 12 is supplied to the power storage circuit 120 via the inverter 18. As a result, a power storage device 19 in the power storage circuit 120 is charged.

A turning electric motor 21 as an example of an electric load driving element is driven by an inverter 20 corresponding to a drive control unit, and in this way, the electric motor 21 can perform both a power running operation and a regenerating operation. While the power running operation of the electric motor 21 is performed, electric power is supplied from the power storage device 19 to the electric motor 21 via the inverter 20. The electric motor 21 drives the turning mechanism 2 via a speed reduction gear 24. While the regenerating operation is performed, the rotational motion of the upper turning body 3 is transmitted to the electric motor 21 via the speed reduction gear 24, and the electric motor 21 generates regenerative electric power. The generated regenerative electric power is supplied to the power storage circuit 120 via the inverter 20. In this way, the power storage device 19 in the power storage circuit 120 may be charged with the electric power. In the example of FIG. 2, the upper turning body 3 is pivotally driven only by the electric motor 21. However, the upper turning body 3 may also be pivotally driven by a combination of the electric motor 21 and a turning hydraulic motor, for example.

The resolver 22 detects the position of a rotational axis of the electric motor 21 in the rotational direction. A detection result of the resolver 22 is input to a control device 30. The rotational speed of the electric motor 21 can be detected by a signal from the resolver 22. The resolver 22 may function as a speed detector for detecting the rotational speed of the electric motor 21.

A mechanical brake 23 is connected to a rotating shaft of the electric motor 21, and generates a mechanical braking force. The mechanical brake 23 may be switched to/from a braking state and a releasing state by an electromagnetic switch under control of a control device 30, for example.

A pilot pump 15 generates a pilot pressure necessary for a hydraulic operating system. The generated pilot pressure is supplied to an operating device 26 via the pilot line 25. The operation device 26 is operated by a driver and includes a lever and a pedal. The operation device 26 converts a primary hydraulic pressure supplied from the pilot line 25 into a secondary hydraulic pressure according to operations by the driver. The secondary hydraulic pressure is transmitted to a control valve 17 via a hydraulic line 27 and is also transmitted to a pressure sensor 29 via another hydraulic line 28.

Pressure information detected by the pressure sensor 29 is input to the control device 30. With this pressure information, the control device 30 can detect the operation status of the lower running body 1, the electric motor 21, the boom 4, the arm 5, and the bucket 6. The control device 30 controls the engine 11, the inverter 18, the inverter 20, and the power rage circuit 120.

A reducing agent for reducing nitrogen oxide included in the exhaust gas of the engine 11 is stored in a reducing agent storage tank 31. Note that a substance such as urea water may be used as the reducing agent, for example. The reducing agent is supplied to an exhaust passage of the engine 11 from the reducing agent storage tank 31. A remaining amount detector 32 detects the remaining amount of the reducing agent in the reducing agent storage tank 31. The detection result is input to the control device 30.

A charge rate detection circuit 44 detects a physical quantity, such as an open circuit voltage, for calculating a charge rate SOC of the power storage device 19, for example. The detection result of the charge rate detection circuit 44 is input to the control device 30. Assuming Voc denotes the open circuit voltage, Vmin denotes the minimum voltage of the power storage device 19, and Vmax denotes the maximum value (rated value) of the power storage device 19, the charge rate SOC may be expressed by the following equation.

$$SOC=(Vc^2-V\text{min}^2)/(V\text{max}^2-V\text{min}^2)$$

An on/off state SWCA of a forced assist switch 38 is input to the control device 30. Also, a switch state SWR of a recovery switch 39 is input to the control device 30. The forced assist switch 38 and the recovery switch 39 are operated by a driver or a maintenance person, for example.

Figure 3:
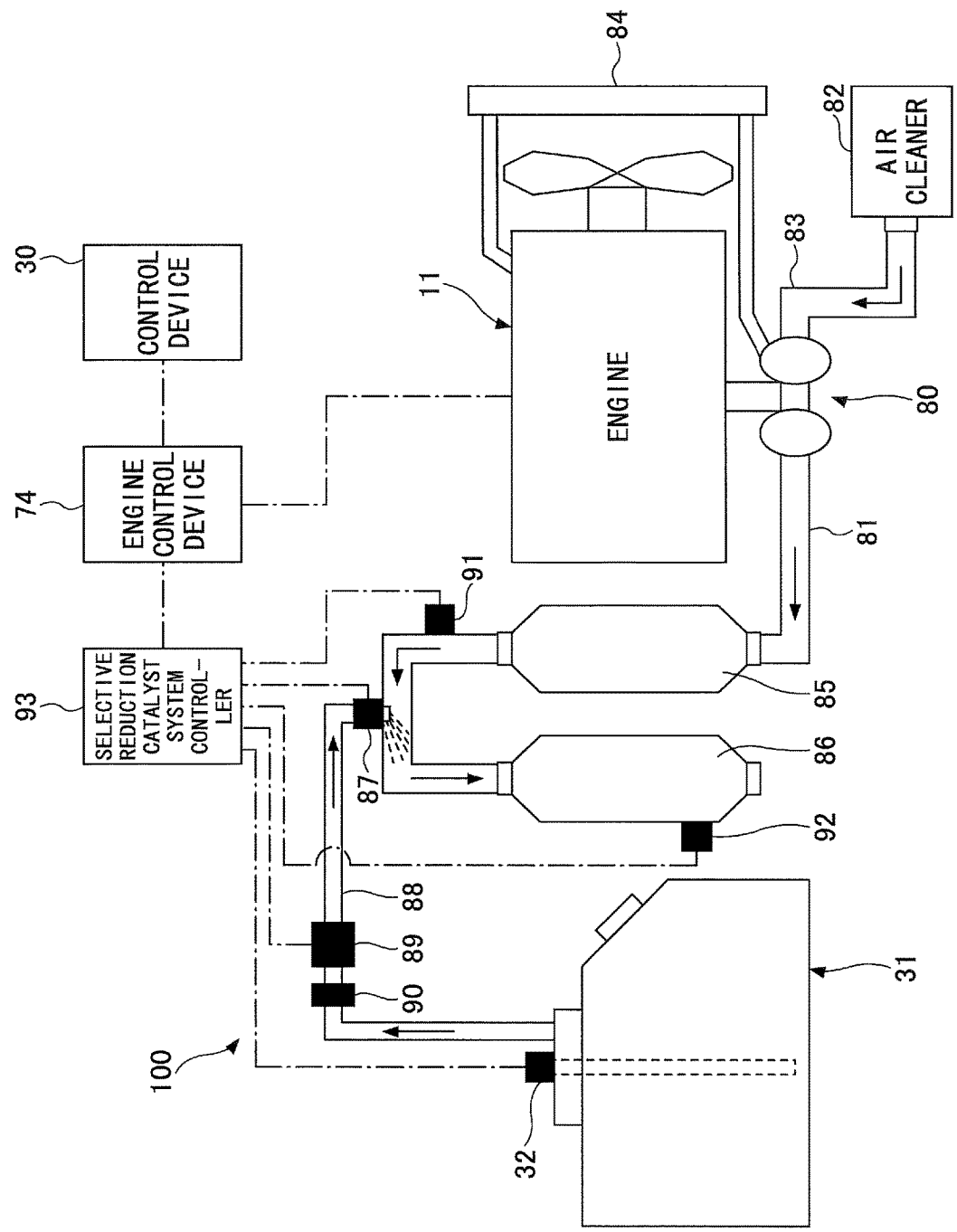
FIG. 3 is a schematic diagram showing an example configuration of a selective reduction catalyst system.

In the following, referring to FIG. 3, a selective reduction catalyst system 100 installed in the shovel of FIG. 1 is described. FIG. 3 is a schematic diagram showing an example configuration of the selective reduction catalyst system 100. The selective reduction catalyst system 100 is an example of an exhaust gas purification system that purifies exhaust gas discharged from the engine 11.

Fuel is supplied to the engine 11 from a fuel tank by a high pressure pump. This high pressure fuel is directly injected into a combustion chamber to be burned. The engine 11, the high pressure pump and the like are controlled by an engine control device 74.

Exhaust gas from the engine 11 passes through a turbocharger 80 and flows to an exhaust pipe 81 provided downstream of the turbocharger 80 to be subjected to a purification treatment by the selective reduction catalyst system 100 and then discharged into the atmosphere.

On the other hand, air introduced into an intake pipe 83 via an air cleaner 82 passes through the turbocharger 80, an intercooler 84, and the like to be supplied to the engine 11.

The exhaust pipe 81 has a diesel particulate filter 85 for collecting particulate matter in the exhaust gas and a selective reduction catalyst 86 for reducing and removing nitrogen oxide (hereinafter sometimes referred to as "NOx") in the exhaust gas provided in series.

The selective reduction catalyst 86 receives a supply of a liquid reducing agent (e.g., urea or ammonia) and continuously reduces and removes NOx in the exhaust gas. In the present embodiment, it is assumed that urea water (aqueous urea solution) is used as the liquid reducing agent in view of its ease of handling.

A urea water injection device 87 for supplying urea water to the selective reduction catalyst 86 is provided upstream of the selective reduction catalyst 86 in the exhaust pipe 81. The urea water injection device 87 is connected to the reducing agent storage tank 31 via a urea water supply line 88.

Also, a urea water supply pump 89 is provided in the urea water supply line 88, and a filter 90 is provided between the reducing agent storage tank 31 and the urea water supply pump 89. The urea water stored in the reducing agent storage tank 31 is supplied to the urea water injection device 87 by the urea water supply pump 89 and is injected from the urea water injection device 87 to an upstream position of the selective reduction catalyst 86 in the exhaust pipe 81.

The urea water injected from the urea water injection device 87 is supplied to the selective reduction catalyst 86. The supplied urea water is hydrolyzed in the selective reduction catalyst 86 to generate ammonia. The generated ammonia reduces the NOx contained in the exhaust gas in the selective reduction catalyst 86, and the exhaust gas is purified by the reduction reaction of the NOx.

A first NOx sensor 91 is disposed upstream of the urea water injection device 87. Further, a second NOx sensor 92 is disposed downstream of the selective reduction catalyst 86. The NOx sensors 91 and 92 detect the NOx concentration in the exhaust gas at their respective positions.

Also, a remaining amount detector 32 is disposed in the reducing agent storage tank 31. The remaining amount detector 32 detects the remaining amount of urea water in the reducing agent storage tank 31.

The NOx sensors 91 and 92, the remaining amount detector 32, the urea water injection device 87, and the urea water supply pump 89 are connected to a selective reduction catalyst system controller 93. Based on the NOx concentration detected by the NOx sensors 91 and 92, the selective reduction catalyst system controller 93 controls the urea water injection device 87 and the urea water supply pump 89 so that an appropriate amount of urea water may be injected into the exhaust pipe 81.

Also, based on the remaining amount of urea water output by the remaining amount detector 32, the selective reduction catalyst system controller 93 calculates the ratio of the remaining amount of urea water to the total volume of the reducing agent storage tank 31 (hereinafter referred to as "urea water remaining amount ratio"). For example, the urea water remaining amount ratio of 50% indicates that urea water equal to half the total volume of the reducing agent storage tank 31 remains in the reducing agent storage tank 31.

The selective reduction catalyst system controller 93 also functions as an abnormality detection unit that detects an abnormality of the selective reduction catalyst system 100. For example, the selective reduction catalyst system controller 93 may detect an abnormality of the selective reduction catalyst system 100 based on outputs of the NOx sensors 91 and 92. For example, the selective reduction catalyst system controller 93 may detect, as an abnormality of the selective reduction catalyst system 100, a state in which the NOx concentration detected at the downstream side of the selective reduction catalyst 86 by the NOx sensor 92 is greater than or equal to a predetermined value. Alternatively, the selective reduction catalyst system controller 93 may detect, as an abnormality of the selective reduction catalyst system 100, a state in which the difference between the NOx concentration at the upstream side of the selective reduction catalyst 86 detected by the NOx sensor 91 and the NOx concentration at the downstream side of the selective reduction catalyst 86 detected by the NOx sensor 92 is less than a predetermined value. Further, the selective reduction catalyst system controller 93 may detect an abnormality of the selective reduction catalyst system 100 based on the remaining amount of urea water. For example, the selective reduction catalyst system controller 93 may detect, as an abnormality of the selective reduction catalyst system 100, a state in which the remaining amount of urea water is less than a predetermined value.

The selective reduction catalyst system controller 93 is connected to the engine control device 74 by a communication system. Also, the engine control device 74 is connected to the control device 30 by a communication system. Note that in the present embodiment, the selective reduction catalyst system controller 93, the engine control device 74, and the control device 30 are configured as separate device units. However, in other embodiments, at least two of these device units may be integrally configured. For example, the selective reduction catalyst system controller 93 may be integrated with the engine control unit 74.

Various types of information relating to the selective reduction catalyst system 100 that is retained by the selective reduction catalyst system controller 93 are configured so that they can be shared with the control device 30 and the engine control device 74. Like the control device 30, the engine control device 74 and the selective reduction catalyst system controller 93 each include a CPU, a RAM, a ROM, an input/output port, and a storage device, for example. The engine control device 74 determines an injection amount of urea water based on collected data. Then, the engine control device 74 transmits a control signal to the urea water injection device 87 via the selective reduction catalyst system controller 93 to control the amount of urea water to be injected with respect to the exhaust gas from the engine 11.

When an abnormality of the selective reduction catalyst system 100 is detected, the selective reduction catalyst system controller 93 outputs the detection result to the control device 30. The control device 30 determines whether an abnormality in the selective reduction catalyst system 100 exists based on the detection result.

The control device 30 continues to control the turning electric motor 21 corresponding to an electric load driving element before and after the abnormality determination. That is, even when an abnormality of the selective reduction catalyst system 100 is detected, if a turning operation is being performed, the control device 30 continues to control the inverter 20 to enable energization control between the inverter 20 and the electric motor 21 until the turning operation is ended. The control device 30 may also continue to control the motor generator before and after the abnormality detection. That is, the control device 30 may continue to control the inverter 18 to enable energization control between the inverter 18 and the motor generator 12. Further, in order to keep the voltage of a DC bus (bus line) connecting the inverter 18, the inverter 20, and the storage circuit 120 constant, a converter may be provided between the DC bus and the power storage device 19 (e.g. capacitor, lithium ion secondary battery). In this case, the control device 30 may continue to control the power storage device 19 before and after the abnormality determination. That is, the control device 30 may continue to control the converter to enable charging and discharging of the power storage device 19.

Figure 4:
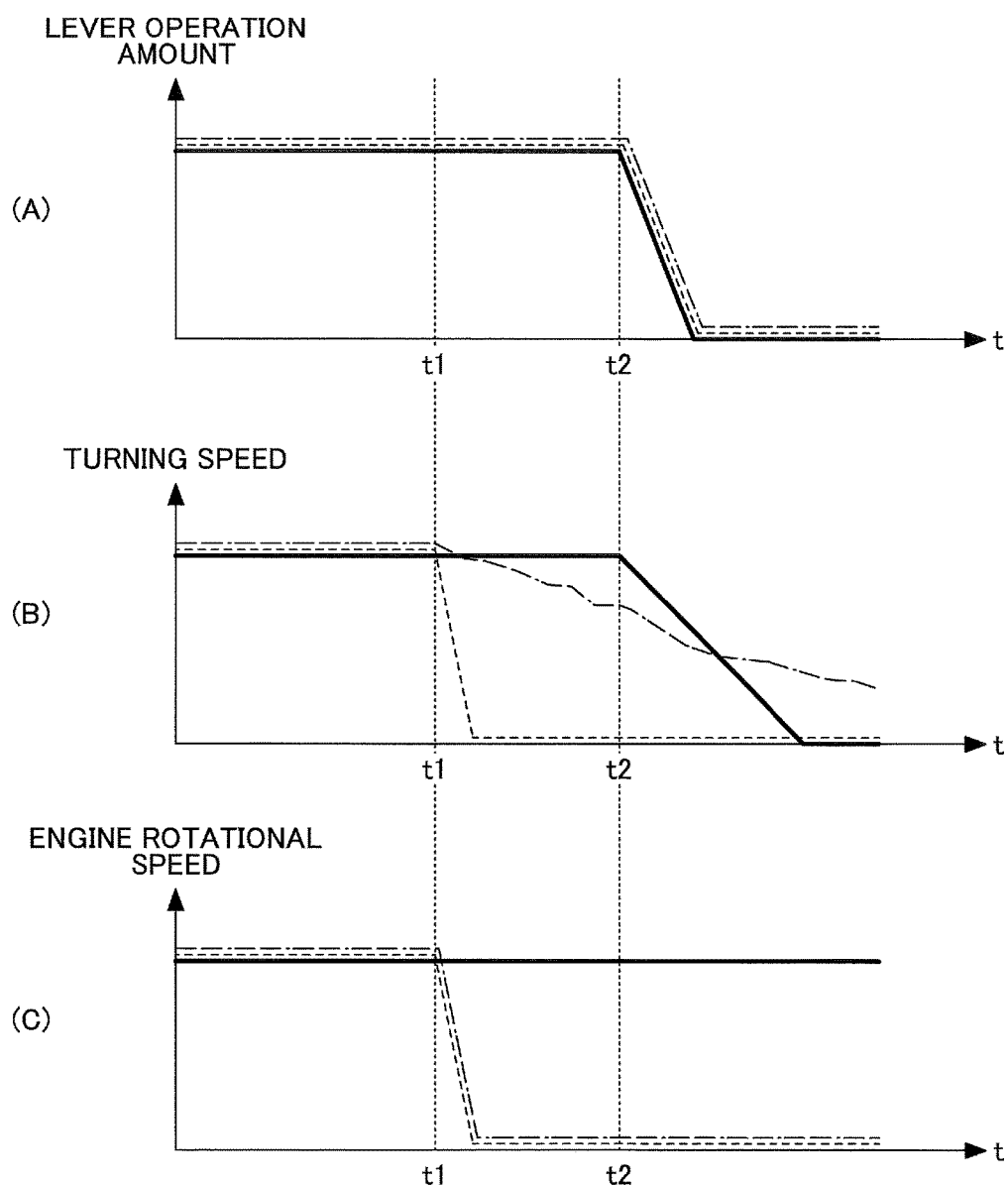
FIG. 4 is a time chart showing temporal transitions in a lever operation amount, a turning speed, and an engine rotational speed when an abnormality is detected in the selective reduction catalyst system while a turning operation is being performed.

In the following, referring to FIG. 4, a process in which the control device 30 continues to control the electric motor 21 when an abnormality of the selective reduction catalyst system 100 is detected while a turning operation is being performed is described. FIG. 4 is a time chart showing temporal transitions of a lever operation amount, a turning speed, and an engine rotational speed. The solid lines represent temporal transitions in an example case where driving operations of the engine 11 and the electric motor 21 are not stopped and the electric motor 21 continues to be controlled when an abnormality of the selective reduction catalyst system 100 is detected. That is, in this example case, even after the abnormality detection, the electric motor 21 continues to be controlled in the same manner as before the abnormality detection according to lever operations of a turning operation lever. The broken lines represent temporal transitions in an example case where the driving operations of the engine 11 and the electric motor 21 are stopped and the electric motor 21 continues to be controlled when an abnormality of the selective reduction catalyst system 100 is detected. That is, in this example case, after the abnormality detection, the electric motor 21 continues to be controlled to enable braking of the turning operation of the upper turning body 3 irrespective of lever operations of the turning operation lever. The alternate long and short dashed lines represent temporal transitions in an example case where driving operations of the engine 11 and the electric motor 21 are stopped and control operations of the electric motor 21 are stopped when an abnormality of the selective reduction catalyst system 100 is detected.

In FIG. 4, graph (A) shows temporal transitions of the lever operation amount of the turning operation lever. In the present embodiment, the turning operation lever has already been operated to reach its maximum operation amount, and the maximum operation amount is maintained through time t1 up until time t2. Then, at time t2, an operation of returning the turning operation lever to a neutral position is performed.

In FIG. 4, graph (B) shows the temporal transitions of the turning speed, and graph (C) shows the temporal transitions of the engine rotational speed.

When an abnormality of the selective reduction catalyst system 100 is detected at time t1, the control device 30 continues to control the electric motor 21 without stopping the driving operations of the engine 11 and the electric motor 21. That is, control operations of the electric motor 21 are continued while maintaining the turning speed and the engine speed. Thus, as indicated by the solid line in graph (B) of FIG. 4, the current speed is maintained until the operation for returning the turning operation lever to the neutral position is performed at time t2. Also, as indicated by the solid line in graph (C) of FIG. 4, the current engine rotational speed is maintained even after the turning operation lever is returned to the neutral position. Thus, the control device 30 can operate the engine 11 and the electric motor 21 without any limitations until the turning operation is completed, even when the remaining amount of urea water falls below a predetermined value during the turning operation, for example, and in this way, the turning speed may be prevented from abruptly changing.

Alternatively, when an abnormality of the selective reduction catalyst system 100 is detected at time t1, the control device 30 may stop driving the engine 11 and the electric motor 21 and continue controlling the electric motor 21. That is, the engine 11 may be stopped and the electric motor 21 may continue to be controlled in order to enable braking of the turning operations of the upper turning body 3. In this case, at time t1, the electric motor 21 starts the regenerative operation irrespective of the lever operations of the turning operation lever, and implements braking of the upper turning body 3 while generating regenerative electric power. Thus, as indicated by the broken line in graph (B) of FIG. 4, the turning speed rapidly decreases and reaches zero. Also, as indicated by the broken line in graph (C) of FIG. 4, the engine rotational speed rapidly decreases to zero. In this way, in a case where the remaining amount of urea water falls below a predetermined value during to turning operation, for example, the control device 30 may promptly stop operations of the engine 11 and the electric motor 21 and prevent exhaust gas with a high concentration of NOx from being discharged. Alternatively, the control device 30 may set up a deceleration pattern in advance, and gradually stop operations of the electric motor 21 according to the deceleration pattern.

On the other hand, if the control operation of the electric motor 21 is stopped when an abnormality of the selective reduction catalyst system 100 is detected at time t1, turning torque including an acceleration torque and a deceleration (braking) torque disappears and the upper turning body 3 continues turning by inertia. The turning speed gradually decreases and reaches zero due to frictional force acting on the turning mechanism 2, as indicated by the alternate long and short dashed line in graph (B) of FIG. 4.

By having the control device 30 continue to control the electric motor 20 even when an abnormality of the selective reduction catalyst system 100 is detected, that is, by continuing to control the inverter 20, the inertia turning of the upper turning body 3 as described above may be prevented. Specifically, by continuing to control the electric motor 21 without stopping the driving operation of the electric motor 21, a turning operation identical to that performed in the case where no abnormality is detected may be performed. Alternatively, by stopping the driving operation of the electric motor 21 and continuing to control the electric motor 21, the electric motor 21 can be promptly stopped. Also, by continuing to control the inverter 18, the control device 30 can supply regenerative electric power to the motor generator 12 when regenerative electric power is generated during deceleration of the electric motor 21. Also, by continuing to control the converter, the control device 30 can supply regenerative electric power to the electricity storage device 19 when regenerative electric power is generated during deceleration of the electric motor 21.

Figure 5:
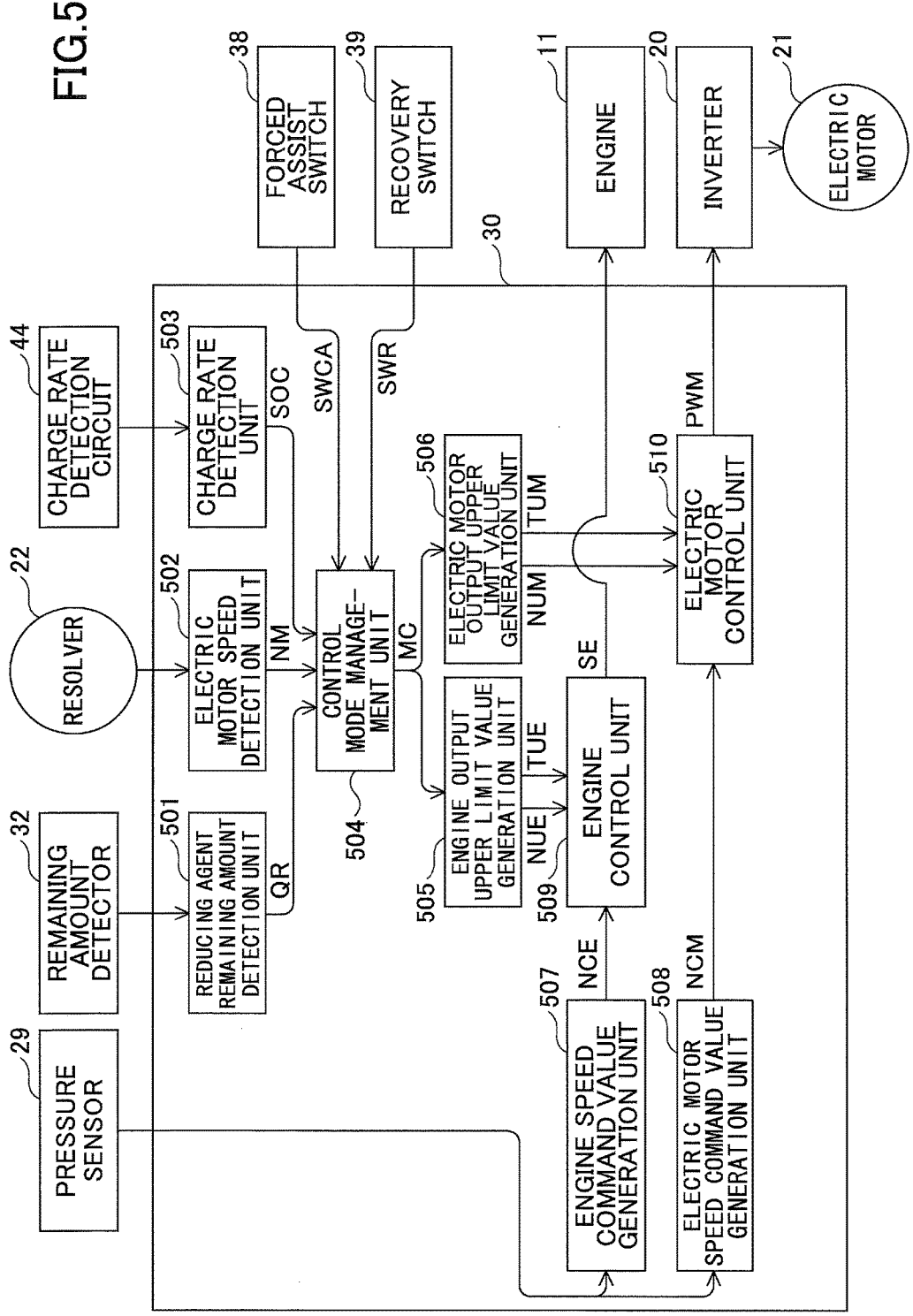
FIG. 5 is a functional block diagram of a control device of the shovel according to an embodiment of the present invention.

In the following, referring to FIG. 5, the control device 30 is described in detail. FIG. 5 is a functional block diagram of the control device 30. When an abnormality is detected during a turning operation, the control device 30 continues normal control operations until the turning operation is stopped and continues the normal control operations even after the turning operation is stopped. In this way, a turning operation may be performed in response to an operation input to the forced assist switch 38, for example.

Note that the functions of the control device 30 may be implemented by a central processing unit (CPU) executing a computer program, for example. The computer program may be stored in a storage device of the control device 30, for example.

Pressure information detected by the pressure sensor 29 is input to an engine speed command value generation unit 507 and an electric motor speed command value generation unit 508. The pressure information includes operation information of the operation device 26 relating to operations, such as a turning operation of the upper turning body 3, a forward/backward operation of the upper turning body 3, and swinging operations of working components, such as the boom 4, the arm 5, and the bucket 6, for example.

The engine speed command value generation unit 507 generates a rotational speed command value NCE for the engine 11 based on the pressure information from the pressure sensor 29. For example, the power to be supplied to the main pump 14 may be obtained based on operation information for a plurality of actuators hydraulically driven by the main pump 14. Based on this power, the rotational speed command value NCE for the engine 11 may be obtained.

The electric motor speed command value generation unit 508 generates a rotational speed command value NCM for the electric motor 21 based on the pressure information from the pressure sensor 29. For example, the rotational speed command value NCM for the electric motor 21 may be obtained based on operation information relating to the turning operation of the upper turning body 3.

An output signal of the remaining amount detector 32 is input to a reducing agent remaining amount detection unit 501. Based on the output signal from the remaining amount detector 32, the reducing agent remaining amount detection unit 501 calculates a remaining amount QR of reducing agent in the reducing agent storage tank 31. An output signal of the resolver 22 is input to an electric motor speed detection unit 502. The electric motor speed detection unit 502 calculates a rotational speed measurement value NM of the electric motor 21 based on the output signal of the resolver 22. An output signal of the charge rate detection circuit 44 is input to a charge rate detection unit 503. The charge rate detection unit 503 calculates a charge rate SOC of the power storage device 19 based on the output signal of the charge rate detection circuit 44.

A control mode management unit 504 determines a control mode MC for the engine 11, the motor generator 12, and the electric motor 21 based on the remaining amount QR of reducing agent, the rotational speed measurement value NM of the electric motor 21, the charge rate SOC of the electric storage device 19, the on/off state SWCA of the forced assist switch 38, and the switch state SWR of the recovery switch 39. Specifically, one control mode is selected from a plurality of control modes MC.

Figure 6:
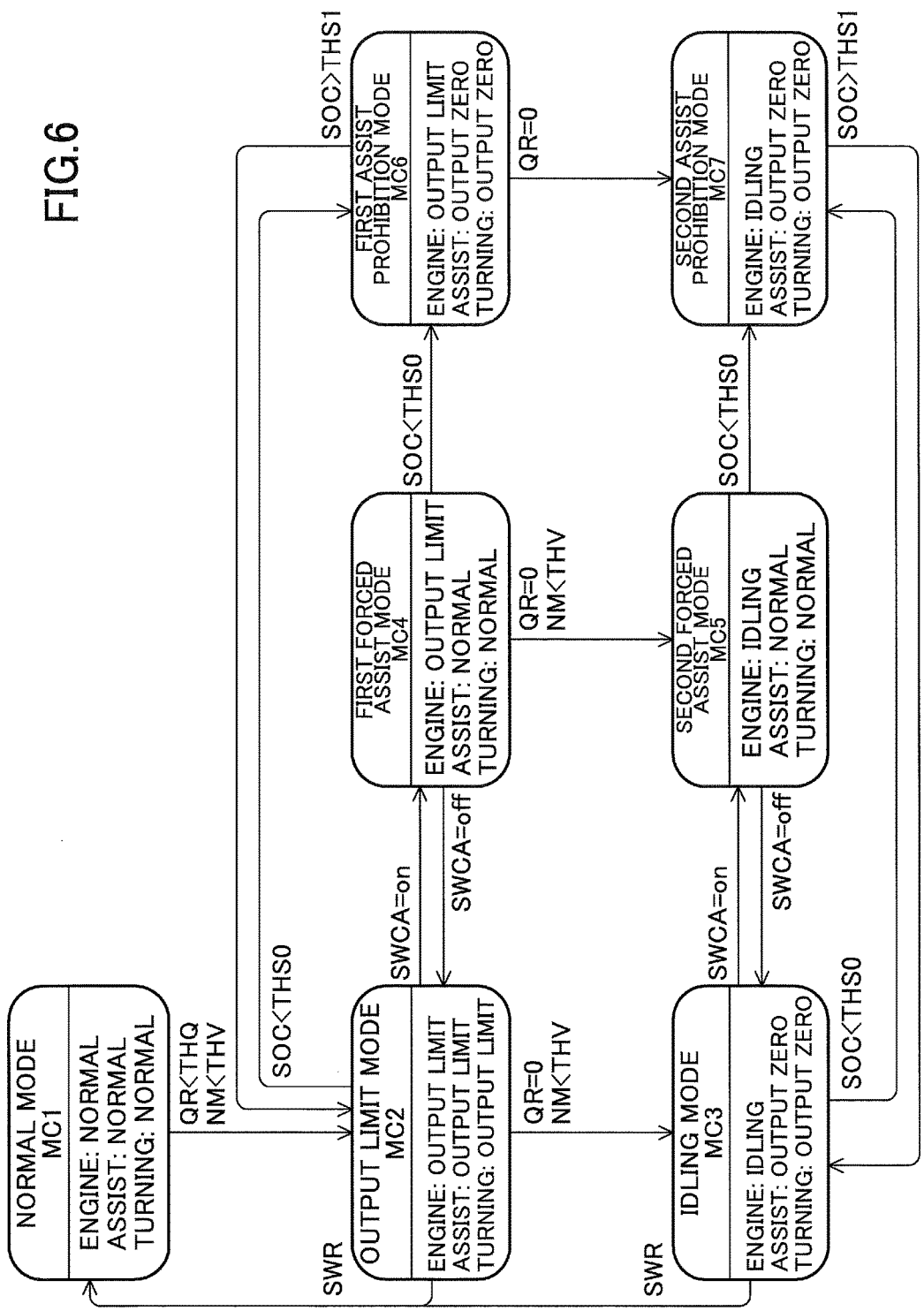
FIG. 6 is a diagram illustrating an example transition between control modes.

FIG. 6 illustrates an example transition between the control modes MC. The control modes MC include a normal mode MC1, an output limit mode MC2, an idling mode MC3, a first forced assist mode MC4, a second forced assist mode MC5, a first assist prohibition mode MC 6, and a second assist prohibition mode MC7. In FIG. 6, example transitions between control modes MC are shown, but not all transitions are shown.

In the normal mode MC1, outputs of the engine 11, the motor generator 12, and the turning electric motor 21 are controlled to not exceed normal output upper limit values. In the output limit mode MC2, outputs of the engine 11, the motor generator 12, and the turning electric motor 21 are controlled to not exceed limited upper limit values that are lower than the normal output upper limit values. In the idling mode MC3, the engine 11 is operated in idling mode, and outputs of the motor generator 12 and the turning electric motor 21 are controlled to be zero.

In the first forced assist mode MC4, an output of the engine 11 is controlled to be less than or equal to the limited upper limit value, and outputs of the motor generator 12 and the turning electric motor 21 are controlled to not exceed the normal output upper limit values. In the second forced assist mode MC5, the engine 11 is operated in idling mode, and outputs of the motor generator 12 and the turning electric motor 21 are controlled to not exceed the normal output upper limit values.

In the first assist prohibition mode MC6, an output of the engine 11 is controlled to be less than or equal to the limited upper limit value, and outputs of the motor generator 12 and the turning electric motor 21 are controlled to be zero. In the second assist prohibition mode MC7, the engine 11 is operated in idling mode, and outputs of the motor generator 12 and the turning electric motor 21 are controlled to be zero.

In the following, conditions for transitioning between the various control modes MC are described. While the control mode MC is in the normal mode MC1, if the remaining amount QR of reducing agent has decreased and the upper turning body 3 is not turning, the control mode MC may transition from the normal mode MC1 to the output limit mode MC2. For example, if the remaining amount QR of reducing agent becomes less than a determination threshold value THQ, it may be determined that the remaining amount QR of reducing agent has decreased. Also, if the rotational speed measurement value NM of the electric motor 21 is less than a determination threshold value THV, it may be determined that the upper turning body 3 is not turning. Note that even if the remaining amount QR of reducing agent has decreased, if a turning operation is being performed, the process of transitioning from the normal mode MC1 to the output limit mode MC2 is put on hold until the turning operation is ended.

While the control mode MC is in the output limit mode MC2, if the driver replenishes the reducing agent and presses the recovery switch 39, the control mode MC may return from the output limit mode MC2 to the normal mode MC1. Note that in FIG. 6, "SWR" indicates that the reducing agent has been replenished and the recovery switch 39 has been pressed.

While the control mode MC is in the output limit mode MC2, if the remaining amount QR of reducing agent becomes substantially zero and the upper turning body 3 is not turning, the control mode MC may transition from the output limit mode MC2 to the idling mode MC3. While the control mode MC is in the idling mode MC3, if the driver replenishes the reducing agent and presses the recovery switch 39, the control mode MC may return to the normal mode MC1 from the idling mode MC3.

While the control mode MC is in the output limit mode MC2, if the forced assist switch 38 is turned on, the control mode MC may transition from the output limit mode MC2 to the first forced assist mode MC4. While the control mode MC is in the first forced assist mode MC4, if the forced assist switch 38 is turned off, the control mode MC may transition from the first forced assist mode MC4 to the output limit mode MC2.

While the control mode MC is in the idling mode MC3, if the forced assist switch 38 is turned on, the control mode MC may transition from the idling mode MC3 to the second forced assist mode MC5. While the control mode MC is in the second forced assist mode MC5, if the forced assist switch 38 is turned off, the control mode MC may transition from the second forced assist mode MC5 to the idle mode MC3.

While the control mode MC is in the output limit mode MC2 or the first forced assist mode MC4, if the charge rate SOC becomes lower than an assist-enabling threshold value THS0, the control mode MC may transition to the first assist prohibition mode MC6. While the control mode MC is in the idling mode MC3 or the second forced assist mode MC5, if the charge rate SOC becomes lower than the assist-enabling threshold value THS0, the control mode MC may transition to the second assist prohibition mode MC7.

While the control mode MC is in the first assist prohibition mode MC6, if the charge rate SOC recovers, the control mode MC may transition from the first assist prohibition mode MC6 to the output limit mode MC2. While the control mode MC is in the second assist prohibition mode MC7, if the charge rate SOC recovers, the control mode MC may transition from the second assist prohibition mode MC7 to the idling mode MC3. For example, when the charge rate SOC exceeds a recovery determination threshold value THS1, a determination may be made that the charge rate SOC has recovered. Note that the recovery determination threshold value THS1 is greater than the assist-enabling threshold value THS0.

While the control mode MC is in the first forced assist mode MC4, if the remaining amount QR of reducing agent becomes substantially zero and the upper turning body 3 is not turning, the control mode MC may transition from the first forced assist mode MC4 to the second forced assist mode MC5. While the control mode MC is in the first forced assist mode prohibition MC6, if the remaining amount QR of reducing agent becomes substantially zero, the control mode MC may transition from the first assist prohibition mode MC6 to the second assist prohibition mode MC7.

Referring back to FIG. 5, further functions of the control device 30 are described below.

An engine output upper limit value generation unit 505 generates an engine output upper limit value based on the current control mode MC. The engine output upper limit value includes a rotational speed upper limit value NUE and a torque upper limit value TUE. When the control mode MC is in the normal mode MC1, a normal rotational speed upper limit value NUE0 is generated as the rotational speed upper limit value NUE, and a normal torque upper limit value TUE0 is generated as the torque upper limit value TUE. When the control mode MC is in the output limit mode MC2, the first forced assist mode MC4, or the first assist prohibition mode MC6, a rotational speed upper limit value NUE1 is generated as the rotational speed upper limit value NUE, and a torque upper limit value TUE1 is generated as the torque upper limit value TUE. The rotational speed upper limit value NUE1 is smaller than the normal rotational speed upper limit value NUE0 and the torque upper limit value TUE1 is smaller than the normal torque upper limit value TUE0. When the control mode MC is in the idling mode MC3, the second forced assist mode MC5, or the second assist prohibition mode MC7, an idling rotational speed NUE2 is generated as the rotational speed upper limit value NUE, and a torque upper limit value TUE2 is generated as the torque upper limit value TUE. The idling rotational speed NUE2 is smaller than the rotational speed upper limit value NUE 1 and the torque upper limit value TUE2 is smaller than the torque upper limit value TUE1.

An electric motor output upper limit value generation unit 506 generates an electric motor output upper limit value based on the current control mode MC. The engine output upper limit value includes a rotational speed upper limit value NUM and a torque upper limit value TUM. When the control mode MC is in the normal mode MC1, the first forced assist mode MC4, or the second forced assist mode MC5, a normal rotational speed upper limit value NUM0 is generated as the rotational speed upper limit value NUM, and a torque upper limit value TUM0 is generated as the torque upper limit value TUM. When the control mode MC is in the output limit mode MC2, a rotational speed upper limit value NUM1 is generated as the rotational speed upper limit value NUM, and a torque upper limit value TUM1 is generated as the torque upper limit value TUM. The rotational speed upper limit value NUM1 is smaller than the normal rotational speed upper limit value NUM0, and the torque upper limit value TUM1 is smaller than the normal torque upper limit value TUM0.

An engine control unit 509 calculates a fuel injection amount SE based on the engine rotational speed command value NCE, the engine rotational speed upper limit value NUE, and the torque upper limit value TUE. Specifically, under the condition that the rotational speed measurement value NE of the engine 11 does not exceed the rotational speed upper limit value NUE and the torque generated by the engine 11 does not exceed the torque upper limit value TUE, the fuel injection amount SE is calculated so that the rotational speed measurement value of the engine 11 approximates the rotation speed command value NCE.

An electric motor control unit 510 generates a pulse width modulation signal PWM for controlling the inverter 20 based on the rotational speed command value NCM of the electric motor 21, the rotational speed upper limit value NUM of the electric motor 21, and the torque upper limit value TUM of the electric motor 21. Specifically, under the condition that the rotational speed measurement value NM of the electric motor 21 does not exceed the rotational speed upper limit value NUM and a torque TM generated by the electric motor 21 does not exceed the torque upper limit value TUM, the inverter 20 is controlled so that the rotational speed measurement value NM of the electric motor 21 approximates the rotational speed command value NCM.

Figure 7A:
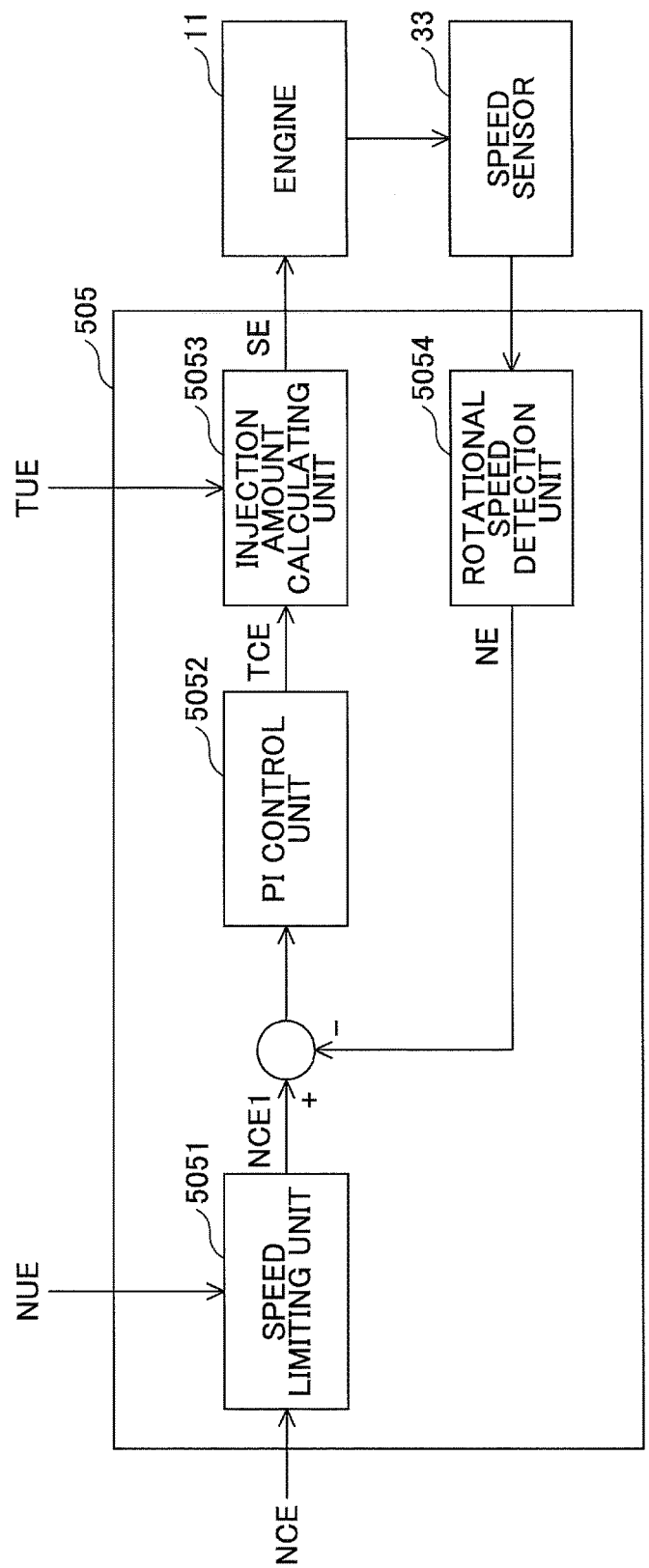
FIG. 7A is a functional block diagram of an engine output upper limit generation unit.

FIG. 7A is an example functional block diagram of the engine output upper limit value generation unit 505. In FIG. 7A, the engine output upper limit value generation unit 505 includes a speed limiting unit 5051, a PI control unit 5052, an injection amount calculation unit 5053, and a rotational speed detection unit 5054.

The speed limiting unit 5051 outputs the rotational speed command value NCE1 based on the engine rotational speed command value NCE and the rotational speed upper limit value NUE. Specifically, in a case where the input rotational speed command value NCE is less than or equal to the rotational speed upper limit NUE, the output rotational speed command value NCE1 is equal to the input rotational speed command value NCE. In a case where the input rotational speed command value NCE exceeds the rotational speed upper limit value NUE, the output rotational speed command value NCE1 is equal to the rotational speed upper limit value NUE.

Figure 8A:
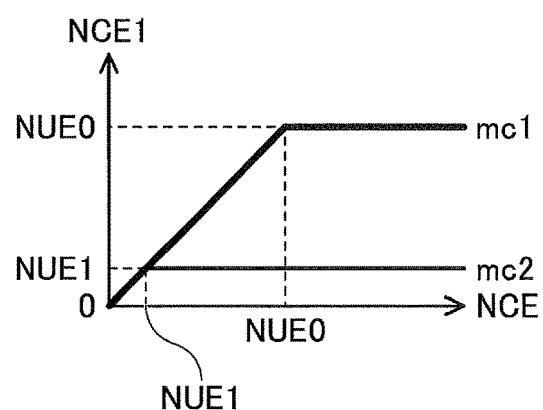
FIG. 8A is a graph showing a relationship between a rotational speed command value and an output rotational speed command value input to a speed limiting unit.

FIG. 8A shows a relationship between the rotational speed command value NCE input to the speed limiting unit 5051 and the output rotational speed command value NCE1.

When the control mode MC is in the normal mode MC1, the normal rotational speed upper limit value NUE0 is set up as the rotational speed upper limit value NUE. Thus, as indicated by solid line mc1 in FIG. 8A, the output rotational speed command value NCE1 varies within the range from 0 to the normal rotational speed upper limit value NUE0. When the control mode MC is in the output limit mode MC2, the rotational speed upper limit value NUE1, which is less than the normal rotational speed upper limit value NUE0, is set up as the rotational speed upper limit value NUE. Thus, in this case, as indicated by solid line mc2 in FIG. 8A, the output rotational speed command value NCE1 does not exceed the rotational speed upper limit value NUE1.

A speed sensor 33 detects the rotational speed of the engine 11. The detection result of the speed sensor 33 is input to the rotational speed detection unit 5054. The rotational speed detection unit 5054 generates the rotational speed measurement value NE of the engine 11 based on the output signal of the speed sensor 33. The PI control unit 5052 performs PI (proportional integral) control based on the difference between the rotational speed command value NCE1 and the rotational speed measurement value NE and outputs a torque command value TCE.

The injection amount calculation unit 5053 calculates the fuel injection amount SE based on the torque command value TCE and the torque upper limit value TUE. Specifically, when the torque command value TCE is less than or equal to the torque upper limit TUE, the fuel injection amount SE is determined so that a torque equal to the torque command value TCE is generated. When the torque command value TCE exceeds the torque upper limit value TUE, the fuel injection quantity SE is determined so that a torque equal to the torque upper limit value TUE is generated. That is, the torque generated by the engine 11 is controlled so that it does not exceed the torque upper limit value TUE.

Figure 8B:
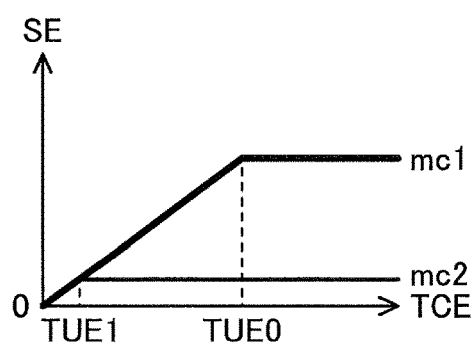
FIG. 8B is a graph showing a relationship between a torque command value and a fuel injection amount.

FIG. 8B shows a relationship between the torque command value TCE and the fuel injection amount SE. When the control mode MC is in the normal mode MC1, if the torque command value TCE is less than or equal to the normal torque upper limit value TUE0, the fuel injection amount SE is determined so that the engine 11 generates a torque equal to the torque command value TCE. If the torque command value TCE exceeds the normal torque upper limit value TUE0, the fuel injection amount SE is determined so that the torque generated by the engine 11 is equal to the torque upper limit value TUE0. That is, the fuel injection amount SE (solid line mc1 in FIG. 8B) is determined so that the torque generated by the engine 11 does not exceed the normal torque upper limit value TUE0.

When the control mode MC is in the output limit mode MC2, the fuel injection amount SE (solid line mc2 in FIG. 8B) is determined so that the torque generated by the engine 11 does not exceed the torque upper limit value TUE1. That is, the torque generated by the engine 11 is controlled so that it does not exceed the torque upper limit value TUE1.

Figure 7B:
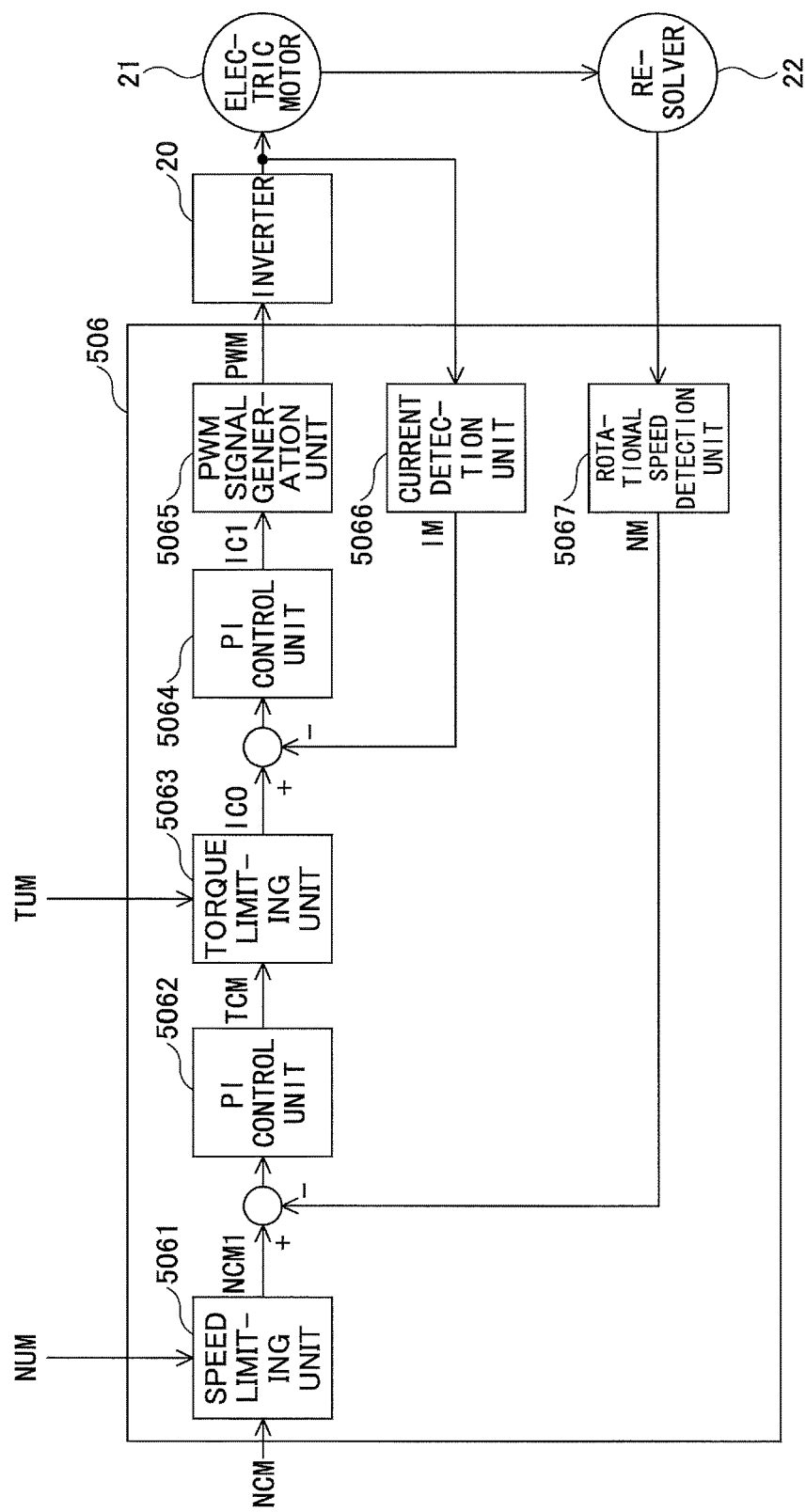
FIG. 7B is a functional block diagram of an electric motor output upper limit generation unit.

FIG. 7B is an example functional block diagram of the electric motor output upper limit value generation unit 506. In FIG. 7B, the electric motor output upper limit value generation unit 506 includes a speed control unit 5061, a PI control unit 5062, a torque limiting unit 5063, a PI control unit 5064, a PWM signal generation unit 5065, a current detection unit 5066, and a rotational speed detection unit 5067. The current detection unit 5066 detects a drive current of the electric motor 21 and outputs a drive current measurement value IM. The rotational speed detection unit 5067 detects the rotational speed of the electric motor 21 and outputs the rotational speed measurement value NM. Note that a rotational speed when the upper turning body 3 is turning in the clockwise direction is defined as positive and a rotational speed when the upper turning body is turning in the counterclockwise direction is defined as negative. Also, a torque for turning the upper turning body 3 in the clockwise direction is defined as positive and a torque for turning the upper turning body 3 in the counterclockwise direction is defined as negative.

The speed limiting unit 5061 outputs a rotational speed command value NCM1 based on the rotational speed command value NCM and the rotational speed upper limit value NUM of the electric motor 21. In the case where the absolute value of the input rotational speed command value NCM is less than or equal to the absolute value of the rotational speed upper limit value NUM, the output rotational speed command value NCM1 is equal to the rotational speed command value NCM. In the case where the absolute value of the input rotational speed command value NCM exceeds the absolute value of the rotational speed upper limit value NUM, the absolute value of the output rotational speed command value NCM1 is equal to the absolute value of the rotational speed upper limit value NUM. Note that the positive/negative sign of the output rotational speed command value NCM1 is the same as that of the rotational speed command value NCM.

Figure 8C:
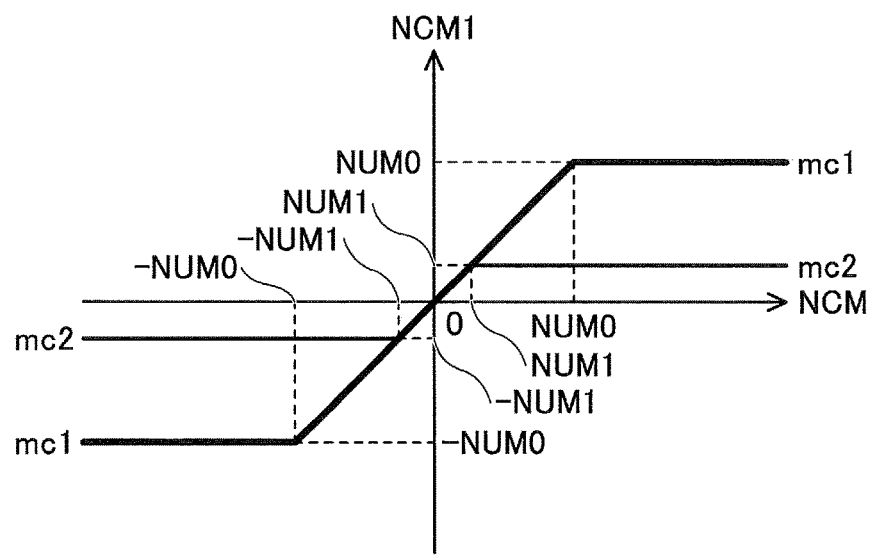
FIG. 8C is a graph showing a relationship between a rotational speed command value input to the speed limiting unit and a rotational speed command value output by the speed limiting unit.

FIG. 8C shows a relationship between the rotational speed command value NCM input to the speed limiting unit 5061 and the output rotational speed command value NCM1.

When the control mode MC is in the normal mode MC1, the normal rotational speed upper limit value NUM0 is set up as the rotational speed upper limit value NUM. Thus, as indicated by solid line mc1 in FIG. 8C, the absolute value of the output rotational speed command value NCM1 varies within a range not exceeding the normal rotational speed upper limit value NUM0. When the control mode MC is in the output limit mode MC2, the rotational speed upper limit value NUM1 is set up as the rotational speed upper limit value NUM. Thus, in this case, as indicated by solid line mc2 in FIG. 8C, the absolute value of the output rotational speed command value NCM1 varies within a range not exceeding the rotational speed upper limit value NUM1.

The PI control unit 5062 performs PI control based on the difference between the rotational speed command value NCM1 and the rotational speed measurement value NM, and outputs the torque command value TCM. The torque limiting unit 5063 outputs a drive current command value IC0 based on the torque command value TCM and the torque upper limit value TUM. When the absolute value of the torque command value TCM is less than or equal to the torque upper limit value TUM, the drive current command value IC0 is determined so that a torque equal to the torque command value TCM is generated. When the absolute value of the torque command value TCM exceeds the torque upper limit value TUM, the drive current command value IC0 is determined so that a torque equal to the torque upper limit value TUM is generated.

Figure 8D:
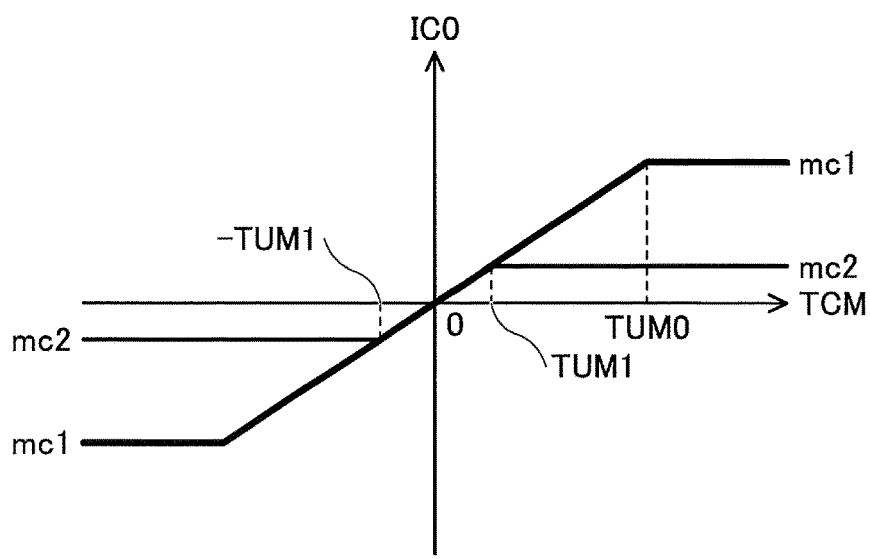
FIG. 8D is a graph showing a relationship between a torque command value and a drive current command value.

FIG. 8D shows a relationship between the torque command value TCM and the drive current command value IC0.

When the control mode MC is in the normal mode MC1, the drive current command value IC0 (solid line mc1 in FIG. 8C) is determined so that the absolute value of the torque generated by the electric motor 21 does not exceed the normal torque upper limit value TUM0. When the control mode MC is in the output limit mode MC2, the drive current command value IC0 (solid line mc2 in FIG. 8D) is determined so that the absolute value of the torque generated by the electric motor 21 does not exceed the torque upper limit value TUM1. That is, the absolute value of the torque generated by the electric motor 21 controlled to be less than or equal to the torque upper limit value TUM1.

The PI control unit 5064 performs PI control based on the difference between the drive current command value IC0 and the drive current measurement value IM, and outputs a drive current command value IC1. The PWM signal generation unit 5065 generates a pulse width modulation signal PWM based on the drive current command value IC1. The inverter 20 is controlled by the pulse width modulation signal PWM.

In the following, effects of transitioning the control mode MC from the normal mode MC1 to the output limit mode MC2 are described. In the output limit mode MC2, the upper limit values for the rotational speed and torque of the engine 11 are respectively limited to the rotational speed upper limit value NUE1 and the torque upper limit value TUE1. Thus, the amount of reducing agent used for reducing nitrogen oxide NOx in the exhaust gas of the engine 11 may be reduced.

When the upper limit value for the output of the engine 11 is limited to a low value, the swinging operation of working components, such as the boom 4, becomes slower than the speed corresponding to the operation by the driver. At this time, if the electric motor 21 operates at the operation speed for the normal mode MC1, the upper turning body 3 turns at the speed corresponding to the operation by the driver. Thus, a mismatch occurs between the vertical swinging operation of the working components and the turning operation of the upper turning body 3, and the driver may sense some awkwardness. Further, unexpected inconvenience may occur in work operations if the vertical swinging operation of the working components is not in accordance with the operation by the driver, and only the upper turning body 3 turns according to the operation by the driver.

When the output of the engine 11 is restricted against the operation by the driver while the upper turning body 3 is turning, the moving trajectory of the working components such as the boom 4 may substantially deviate from the moving trajectory expected by the driver. In the present embodiment, when the turning operation is continuing, the control mode MC does not transition from the normal mode MC1 to the output limit mode MC 2, and the transition of the control mode MC takes place only after the turning operation is ended. In this way, a situation may be avoided where the moving trajectory of the working components substantially deviates from the moving trajectory expected by the driver.

In the present embodiment, upper limit values for the rotational speed and the torque of the engine 11 are limited to low values, and at the same time, upper limit values for the rotational speed and the torque of the electric motor 21 are limited to the rotational speed upper limit value NUM1 and the torque upper limit value TUM1. In this way, consistency may be maintained between the vertical swinging operation of the working components and the turning operation of the upper turning body 3 so that the driver may be less likely to sense awkwardness.

In the following, effects of transitioning the control mode MC from the output limit mode MC2 to the idling mode MC3 are described. In the idling mode MC3, the engine 11 is maintained in an idling state. Thus, even when the remaining amount QR of reducing agent is zero, nitrogen oxide NOx in exhaust gas can be controlled to a low concentration.

In the following, effects of transitioning the control mode MC from the output limit mode MC2 to the first forced assist mode MC4 are described. In the output limit mode MC2, the outputs of both the engine 11 and the motor generator 12 are limited. In the first forced assist mode MC4, although the output of the engine 11 is limited, the motor generator 12 can output power up to the normal output upper limit value. By raising the upper limit value for the output of the motor generator 12, the amount of oil delivered from the main pump 14 may be temporarily increased. For example, by temporarily increasing the driving force of the crawler, escape from a rough road may be facilitated. When the motor generator 12 is operated to generate an output close to the normal output upper limit value, the charge rate SOC of the power storage device 19 tends to rapidly decrease. For this reason, the time during which the motor generator 12 can be operated to generate an output close to the normal output upper limit value is relatively short (e.g., several tens of seconds).

In the following, effects of transitioning the control mode MC from the idling mode MC3 to the second forced assist mode MC5 are described. In the idling mode MC3, the engine 11 is in the idling state, and as such, the shovel can only run at an extremely low speed. Also, going up a slope may be difficult. In the second forced assist mode MC5, the main pump 14 may be driven by the motor generator 12 to increase running capacity. In this way, for example, running capacity may be secured until reaching a reducing agent supply point.

In the following, effects of transitioning the control mode MC to the first assist prohibition mode MC6 or the second assist prohibition mode MC7 are described. In the first assist prohibition mode MC6 and the second assist prohibition mode MC7, no electric power is supplied to the electric motor generator 12 and the electric motor 21 even when the forcible assist switch 38 is turned on. In this way, excessive discharging of the power storage device 19 may be avoided.

In the above embodiment, when the remaining amount QR of reducing agent reaches zero, the engine 11 is brought into the idling state by transitioning the control mode MC to the idling mode MC3. The engine 11 may be forcibly stopped when the remaining amount QR of reducing agent reaches zero. Even in this case, in the second forced assist mode MC5, minimum required travel and position adjustment of the working components may be carried out.

Also, in the above embodiment, as shown in FIG. 7A, the output of the engine 11 is limited by setting upper limit values for the rotational speed and the torque of the engine 11 to the rotational speed upper limit value NUE1 and the torque upper limit value TUE1, respectively. However, in some embodiments, the output of the engine 11 may be limited by only setting an upper limit for one of the rotational speed and the torque of the engine 11, for example. Likewise, the output of the electric motor 21 may be limited by only setting an upper limit for one of the rotational speed and the torque of the electric motor 21, for example.

Also, in the above embodiment, when the driver presses the recovery switch 39 while the control mode MC is in the output limit mode MC2 or the idling mode MC3, the control mode MC returns to the normal mode MC1. However, in some embodiments, the control mode MC may return to the normal mode MC1 in response to the driver pressing the recovery switch 39 while the control mode MC is in the first forced assist mode MC4, the second forced assist mode MC5, the first assist prohibition mode MC6, or the second assist prohibition mode MC7, for example. Also, in some embodiments, the recovery switch 39 may be omitted because the control device 30 is capable of detecting the remaining amount QR of reducing agent.

Figure 9:
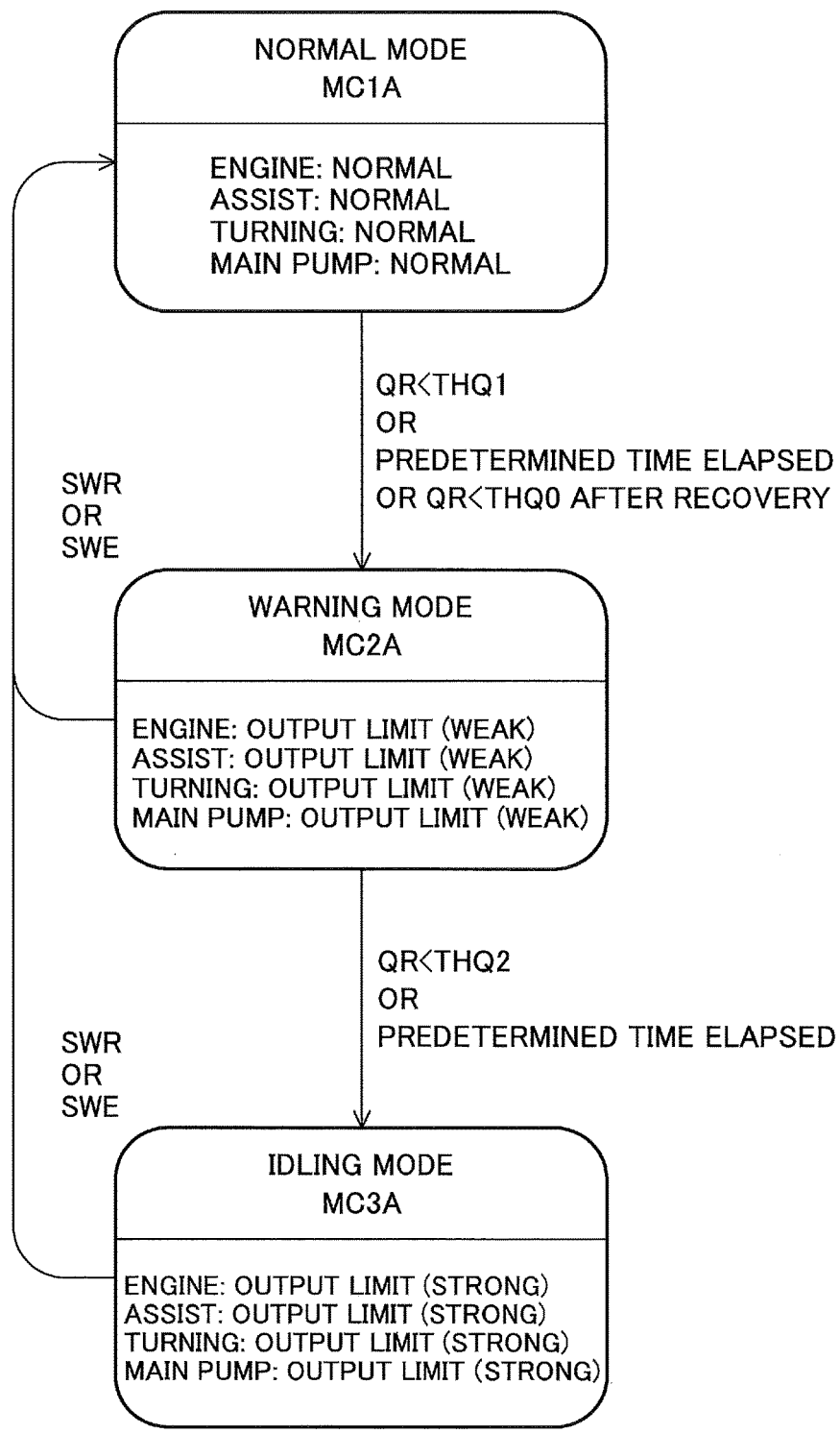
FIG. 9 is a diagram illustrating another example transition between control modes.

In the following, another example transition between the control modes MC is described with reference to FIG. 9. FIG. 9 shows an example case where the output of the engine 11 and the output of the electric motor 21 are limited after an abnormality is detected. In FIG. 9, the control modes MC include a normal mode MC1A, a warning mode MC2A, and an idling mode MC3A. Note that FIG. 9 illustrates example transitions between the control modes MC, but not all transitions are shown.

In the normal mode MC1A, the outputs of the engine 11, the motor generator 12, the electric motor 21, and the main pump 14 are controlled to not exceed their corresponding normal output upper limit values. In the warning mode MC2A, the outputs of the engine 11, the motor generator 12, the electric motor 21, and the main pump 14 are controlled to not exceed their corresponding first limit upper limit values that are lower than the normal output upper limit values (output limit (weak)). In the idling mode MC3A, the outputs of the engine 11, the motor generator 12, the electric motor 21, and the main pump 14 are controlled to not exceed their corresponding second limit upper limit values that are lower than the first limit upper limit values (output limit (strong)).

In the following, conditions for transitioning between the control modes MC are described. When the control mode MC is in the normal mode MC1A and the remaining amount QR of reducing agent becomes less than the determination threshold value THQ1, the control mode MC transitions from the normal mode MC1A to the warning mode MC2A.

When an escape switch is pressed while the control mode MC is in the warning mode MC2A, even if the reducing agent is not replenished, that is, even if the remaining amount QR of reducing agent is still less than the determination threshold value THQ1, the control mode MC returns to the normal mode MC1A from the warning mode MC2A. Note that "SWE" in FIG. 9 indicates that the escape switch has been pressed. In this case, operation in the normal mode MC1A may be enabled until a predetermined time period elapses after the control mode MC has returned to the normal mode MC1A or until the remaining amount QR of reducing agent reaches or falls below the determination threshold value THQ0 (e.g., zero) after the control mode MC has returned to the normal mode MC1A, for example. Like the forced assist switch 38 and the recovery switch 39, the escape switch is connected to the control device 30. When the predetermined time period has elapsed after the control mode MC has returned to the normal mode MC1A or when the remaining amount QR of reducing agent reaches or falls below the determination threshold value THQ0 (e.g., zero) after the control mode MC has returned to the normal mode MC1A, the control mode MC transitions from the normal mode MC1A to the warning mode MC2A. Also, the control mode MC returns from the warning mode MC2A to the normal mode MC1A when the reducing agent is replenished and the recovery switch 39 is pressed while the control mode MC is in the warning mode MC2A. Note that "SWR" in FIG. 9 indicates that the reducing agent has been replenished and the recovery switch 39 has been pressed. Also, note that in this case, the control mode MC does not transition from the normal mode MC1A to the warning mode MC2A even after the predetermined time period elapses after the control mode MC has returned to the normal mode MC1A. This is because the reducing agent has been replenished.

When the remaining amount QR of reducing agent becomes less than a determination threshold value THQ2 (THQ2<THQ1) while the control mode MC is in the warning mode MC2A, the control mode MC may transition from the warning mode MC2A to the idling mode MC3A. Alternatively, when the elapsed time after the control mode MC has transitioned to the warning mode MC2A exceeds the predetermined time period, the control mode MC may transition from the warning mode MC2A to the idling mode MC3A.

When the escape switch is pressed while the control mode MC is in the idling mode MC3A, even if the reducing agent is not replenished, that is, even if the remaining amount QR of reducing agent is less than the determination threshold THQ1, the control mode MC returns from the idling mode MC3A to the normal mode MC1A. In this case, operation in the normal mode MC1A is enabled until the predetermined time period elapses after the control mode MC has returned to the normal mode MC1A or until the remaining amount QR of reducing agent reaches or falls below the determination threshold value THQ0 (e.g., zero) after the control mode MC has returned to the normal mode MC1A. When the predetermined time period has elapsed after the control mode MC has returned to the normal mode MC1A or when the remaining amount QR of reducing agent reaches or falls below the determination threshold value THQ0 (e.g., zero) after the control mode MC has returned to the normal mode MC1A, the control mode MC transitions from the normal mode MC1A to the idling mode MC3A. Also, the control mode MC returns from the idling mode MC3A to the normal mode MC1A when the reducing agent is replenished and the recovery switch 39 is pressed while the control mode MC is in the idling mode MC3A. However, in this case, the control mode MC does not transition from the normal mode MC1A to the idling mode MC3A even when the predetermined time period has elapsed after the control mode MC has returned to the normal mode MC1A. This is because the reducing agent has been replenished.

Figure 10:
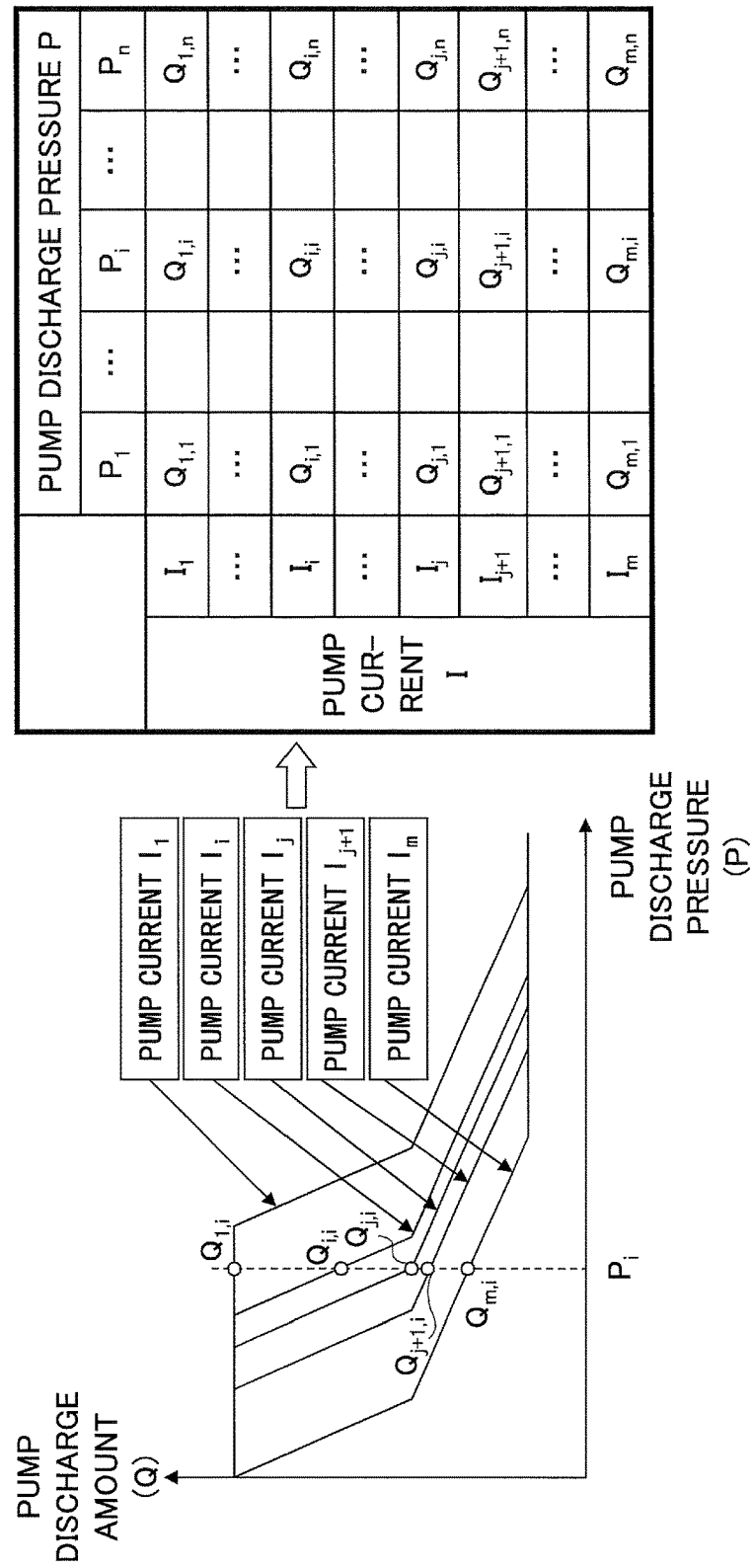
FIG. 10 is a diagram showing a relationship between a pump discharge pressure and a pump discharge amount.
Figure 11:
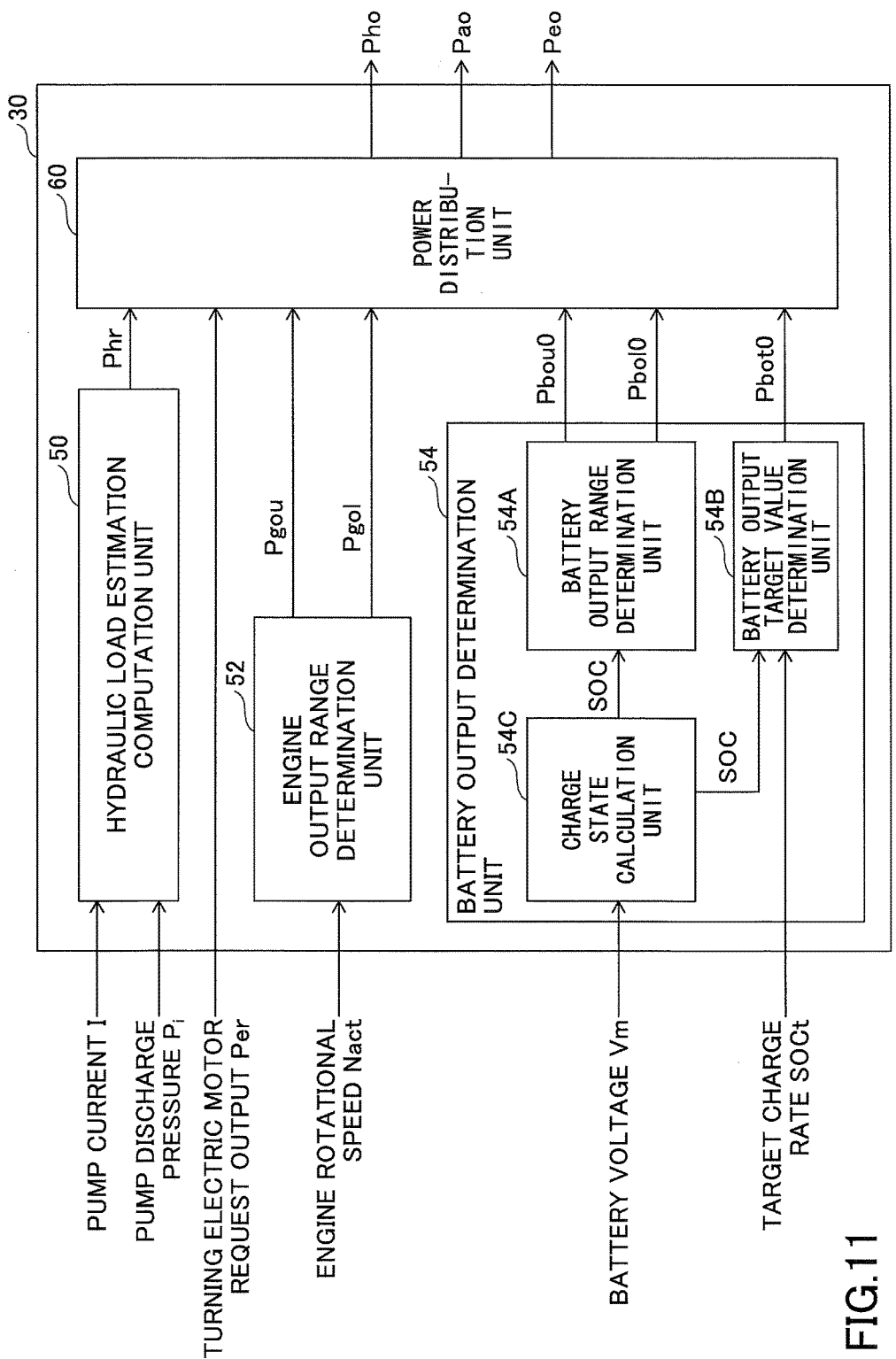
FIG. 11 is a functional block diagram of a control device that executes a power distribution process.

In the following, with reference to FIGS. 10 to 12, a power distribution process as another example process in which the control device 30 controls the outputs of the engine 11 and the electric motor 21 is described. FIGS. 10 to 12 show examples in which the output of the electric motor 21 is limited according to a limit set up for the output of the engine 11 after an abnormality has been detected.

FIG. 10 shows a relationship between a pump discharge pressure P and a pump discharge amount Q, which is determined by a pump current I corresponding to an engine output upper limit value. When the pump current I is determined, the pump discharge amount Q for obtaining the pump discharge pressure P can be determined. The graph of FIG. 10 shows a relationship between the pump discharge pressure P and the pump discharge amount Q determined by the pump current I when the pump current I is varied within a range from $I_1$ to $I_m$. The table indicated at the right side of FIG. 10 corresponds to a P-Q map representing the relationship between the pump discharge pressure P and the pump discharge amount Q based on the relationship indicated in the graph. In the P-Q map, pump discharge amounts Q required for obtaining the pump discharge pressures $P_1$ to $P_n$ are indicated for each of the pump currents $I_1$ to $I_m$. For example, as can be appreciated from the P-Q map, in order to obtain the pump discharge pressure $P_i$ when the pump current I is set to $I_j$, the pump discharge amount Q should be set to $Q_{j,i}$ as indicated in the cell where the row of and the column of $P_i$ intersect.

The control device 30 uses such a P-Q map to perform horsepower control according to limits on the output of the engine 11.

In the following, with reference to FIG. 11, a manner in which the control device 30 distributes power of the engine 11 and the electric motor 21 based on the hydraulic load is described. FIG. 11 is a functional block diagram of the control device 30 that executes the power distribution process. By implementing such power distribution process, the control device 30 can appropriately control the load of the engine 11 by controlling an assist amount of the motor generator 12. In this way, overloading on the engine 11 can be prevented, and the engine 11 can be operated under efficient conditions.

In FIG. 11, the pump current I, the pump discharge pressure $P_i$, a turning electric motor required output Per, an engine rotational speed Nact, a battery voltage Vm, and a target charge rate SOCt are input to the control device 30.

The turning electric motor required output Per corresponds to the electric power required by the electric load. The turning electric motor required output Per may be calculated based on the operation amount of the operation lever operated by the driver, for example.

The engine rotational speed Nact corresponds to the actual engine speed of the engine 11. The engine 11 is always driven when the shovel is running, and its engine speed Nact is detected. The battery voltage Vm corresponds to the voltage between terminals of the power storage device 19 and is detected by a voltmeter.

The pump current I and the pump discharge pressure $P_i$ are input to a hydraulic load estimation computation unit 50. The hydraulic load estimation computation unit 50 calculates a hydraulic load request output Phr using the pump current I and the pump discharge pressure $P_i$. The calculated hydraulic load request output Phr is supplied to a power distribution unit 60.

The engine rotational speed Nact is input to an engine output range determination unit 52. A map or conversion table for obtaining the engine output upper limit value and the engine output lower limit value from the engine speed Nact is stored in an engine output range determination unit 52. The engine output range determination unit 52 calculates an engine output upper limit value Pgou and an engine output lower limit value Pgol based on the input engine speed Nact and supplies the engine output upper limit value Pgou and the engine output lower limit value Pgol to the power distribution unit 60.

The battery voltage Vm and the target charge rate SOCt are input to a battery output determination unit 54. The battery output determination unit 54 includes a battery output range determination unit 54A, a battery output target value determination unit 54B, and a charge state calculation unit 54C. The charge state calculation unit 54C calculates the charge rate SOC from the input battery voltage Vm. The calculated charging rate SOC is supplied to the battery output range determination unit 54A and the battery output target value determination unit 54B.

The battery output range determination unit 54A stores a map or a conversion table for calculating a battery output upper limit value and a battery output lower limit value based on the charge rate SOC. The battery output target value determination unit 54B stores a map or a conversion table for calculating a battery output target value based on the charge rate SOC and the target charge rate SOCt. Such a map or conversion table may define a relationship between a battery output target value and a deviation between the charge rate SOC and the target charge rate SOCt that have been input, for example. The target charge rate SOCt may be determined in any arbitrary manner and may be a fixed value or a variable value. The battery output range determination unit 54A obtains a battery output upper limit value Pbou0 and a battery output lower limit value Pbol0 based on the charge rate SOC and supplies the obtained values to the power distribution unit 60. The battery output target value determination unit 54B calculates a battery output target value Pbot0 based on the charge rate SOC and the target charge rate SOCt that have been input, and supplies the calculated battery output target value Pbot0 to the power distribution unit 60.

The battery output upper limit value Pbou0 corresponds to the upper limit value for the discharge power. The battery output lower limit value Pbol0 is a negative value, and the absolute value thereof corresponds to the upper limit value for the charging power.

The power distribution unit 60 determines a final hydraulic load output Pho, a motor generator output Pao for the motor generator 12, and an electric load output Peo based on the hydraulic load request output Phr, the turning electric motor required output Per, the engine output upper limit value Pgou, the engine output lower limit value Pgol, the battery output upper limit value Pbou0, the battery output lower limit value Pbol0, and the battery output target value Pbot0. At this time, the power distribution unit 60 determines the final hydraulic load output Pho, the motor generator output Pao, and the electric load output Peo in a manner such that the engine output falls within the range defined by the engine output upper limit value Pgou and the engine output lower limit value Pgol, and the battery output falls within the range defined by the battery output upper limit value Pbou0 and the battery output lower limit value Pbol0, and the power distribution unit 60 then outputs the determined values. The control device 30 controls the motor generator 12 based on the above determined output values.

As described above, the control device 30 can accurately calculate the hydraulic load request output Phr and control the assist amount of the motor generator 12 to thereby appropriately control the load of the engine 11. In this way, overloading on the engine 11 can be prevented, and the engine 11 can be operated under efficient conditions.

Also, in some embodiments, the power distribution unit 60 may determine the final hydraulic load output Pho and the electric load output Peo in a manner such that the ratio of the hydraulic load output Pho to a total required output and the ratio of the electric load output Peo to the total required output do not fluctuate. The total required output is the sum of the hydraulic load output Pho, the motor generator output Pao, and the electrical load output Peo. In this case, when the hydraulic load request output Phr decreases, the power distribution unit 60 lowers the electric load output Peo in conjunction with lowering the hydraulic load output Pho. That is, because the output of the engine 11 corresponding to the output supply side is reduced due to the output limit of the engine 11, the power distribution unit 60 reduces the hydraulic load output Pho and the electric load output Peo. As a result, the respective outputs of the main pump 14 and the electric motor 21 are reduced in accordance with the decrease in the output of the engine 11.

In the following, referring to FIG. 12, a process that is implemented when the control device 30 of FIG. 11 detects an abnormality of the selective reduction catalyst system 100 while the turning operation is continuing is described. FIG. 12 is a time chart showing the respective temporal transitions of the lever operation amount, the turning speed, the engine output, and the pump output.

In FIG. 12, graph (A) shows a temporal transition of the lever operation amount of the turning operation lever. In the present embodiment, the turning operation lever has already been operated to the maximum operation amount, and the maximum operation amount is maintained through time t1 up until time t2. Then, at time t2, an operation of returning the turning operation lever to the neutral position is performed.

In FIG. 12, graph (B) shows a temporal transition of the turning speed, graph (C) shows a temporal transition of the engine output, and graph (D) shows a temporal transition of the pump output.

When an abnormality of the selective reduction catalyst system 100 is detected at time t1, the control device 30 lowers the engine output upper limit value in order to prevent exhaust gas having a high NOx concentration from being discharged.

For example, when the remaining amount of urea water becomes less than or equal to a first threshold value, the control device 30 may lower the torque upper limit value for the engine 11 as the engine output upper limit value to limit the torque of the engine 11 to less than or equal to a predetermined value. Alternatively, when the remaining amount of urea water becomes less than or equal to a second threshold value, the control device 30 may lower the rotational speed upper limit value for the engine 11 as the engine output upper limit value to limit the rotational speed of the engine 11 to a predetermined rotational speed.

When the engine output upper limit value decreases, the engine output decreases as shown in graph (C) of FIG. 12. Also, when the engine output upper limit value decreases, the pump current I also decreases, and as a result, the pump output also decreases as shown in graph (D) of FIG. 12.

Also, when the remaining amount of urea water reaches each of a plurality of thresholds including the first threshold value and the second threshold value, the control device 30 limits the output of the engine 11 while continuing to control the electric motor 21.

Specifically, the power distribution unit 60 of the control device 30 lowers the hydraulic load request output Phr, and hence, the hydraulic load output Pho, in accordance with the decrease in the pump current I. Then, the electric load output Peo is decreased in conjunction with the decreased in the hydraulic load output Pho. The decrease in the electric load output Peo causes a decrease in the output of the electric motor 21 irrespective of the limits set up by the speed limiting unit 5061 and the torque limiting unit 5063, and also irrespective of the lever operation of the turning operation lever.

As a result, the turning speed starts to decrease at time t1 as shown in graph (B) of FIG. 12 and falls to a level commensurate with the electric load output Peo corresponding to the hydraulic load output Pho.

In this way, when an abnormality of the selective reduction catalyst system 100 is detected while the turning operation is continuing, the control device 30 can prevent exhaust gas having a high NOx concentration from being discharged by lowering the engine output.

Also, even when an abnormality of the selective reduction catalyst system 100 is detected, by continuing to control the electric motor 21, the control device 30 can maintain the turning speed of the electric motor 21 at a level commensurate with the electric load output Peo corresponding to the hydraulic load output Pho. Further, even after the turning operation is stopped, the control device 30 may still implement energization control between the inverter 20 and the electric motor 21, and in this way, the control device 30 can restart drive operations of the electric motor 21 without delay when the turning operation lever is operated again. Also, by continuing to control the inverter 18 and the converter, the control device 30 can supply electric power to the motor generator 12 and the electric storage device 19 without delay when the electric motor 21 generates regenerative electric power.

Also, the control device 30 may refrain from limiting the output of the engine 11 when an attachment and/or the turning mechanism 2 are being operated (while the turning operation lever is being operated) and only limit the output of the engine 11 after the turning operation is ended. In this case, the limit on the output of the engine may be implemented when the next operation (lever operation) is performed. In a shovel, it is rare for a single operation (e.g., one turning operation, one arm closing operation, etc.) to continue for a long period of time, and as such, the control device 30 may refrain from limiting the output of the engine 11 and continue the operation for a short period of time as an emergency measure, for example.

Although the present invention has been described above with reference to illustrative embodiments, the present invention is not limited to these embodiments. For example, it will be obvious to those skilled in the art that various modifications, improvements, and combinations thereof may be made without departing from the scope of the present invention.

What is claimed is:

1. A shovel comprising:
a lower running body;
an upper turning body pivotally mounted on the lower running body;
an engine mounted on the upper turning body;
a motor generator driven by the engine;
a power storage device for storing electric power generated by the motor generator;
an electric motor for supplying regenerative electric power to the power storage device;
a selective reduction catalyst system for purifying exhaust gas by injecting a reducing agent stored in a reducing agent storage tank into an exhaust pipe of the engine;
an abnormality detection unit for detecting an abnormality of the selective reduction catalyst system; and
a control device that performs abnormality determination on the selective reduction catalyst system based on a comparison of a detection result of the abnormality detection unit against one or more predetermined threshold values;
wherein the control device continues to control the electric motor before and after the abnormality determination.

2. The shovel according to claim 1, wherein the control device performs the abnormality determination based on a remaining amount of the reducing agent.

3. The shovel according to claim 1, wherein when a remaining amount of the reducing agent reaches each of the one or more predetermined threshold values, the control device limits an output of the engine while continuing to control the electric motor.

4. The shovel according to claim 3, wherein when the remaining amount of the reducing agent reaches a first threshold value among the the one or more predetermined threshold values, the control device limits a torque of the engine to less than or equal to a predetermined value.

5. The shovel according to claim 3, wherein when the remaining amount of the reducing agent reaches a second threshold value among the the one or more predetermined threshold values, the control device reduces a rotational speed of the engine to a predetermined rotational speed.

6. The shovel according to claim 1, wherein the control device continues to control the motor generator and the power storage device before and after the abnormality determination.

7. The shovel according to claim 3, wherein the control device performs horsepower control according to the limit on the output of the engine.

8. The shovel according to claim 1, wherein the control device performs the abnormality determination based on a concentration of nitrogen oxide in the exhaust gas of the engine.

9. The shovel according to claim 1, wherein an output of the electric motor is calculated by a power distribution unit.

10. The shovel according to claim 1, further comprising:
a remaining amount detector for detecting a remaining amount of the reducing agent stored in the reducing agent storage tank;
a hydraulic pump driven by a power generated by the engine; and
an actuator driven by the hydraulic pump;
wherein the electric motor is driven by the electric power from the power storage device;
wherein the control device controls the engine and the electric motor by implementing one control mode selected from a plurality of control modes based on a detection result of the remaining amount detector;
wherein the control mode includes a normal mode and an output limit mode, and in the output limit mode, an output of the engine is controlled to be less than or equal to a limited upper limit value that is lower than a normal out upper limit value for the engine in the normal mode; and
wherein when the control device determines that the remaining amount detected by the remaining amount detector is less than a predetermined threshold value from among the one or more predetermined threshold values, the control device transitions the control mode from the normal mode to the output limit mode.

11. The shovel according to claim 10, further comprising:
a speed detector for detecting a rotational speed of the electric motor;
wherein when the control device determines that the remaining amount detected by the remaining amount detector is less than the determination threshold value, the control device determines whether a turning operation is continuing based on a rotational speed measurement value detected by the speed detector; and
wherein when the turning operation is continuing, the control device transitions the control mode from the normal mode to the output limit mode after the turning operation is ended.

12. The shovel according to claim 10, wherein
when the remaining amount of the reducing agent becomes substantially zero while the control mode is in the output limit mode, the control device transitions the control mode from the output limit mode to an idling mode; and
in the idling mode, the engine is controlled to be in an idling state.

13. The shovel according to claim 12, further comprising:
a forced assist switch; and
wherein the motor generator assists the engine using the electric power from the power storage device to drive the hydraulic pump;
wherein when the forced assist switch is turned on while the control mode is in the output limit mode or the idling mode, the control device drives the hydraulic pump by controlling the motor generator to operate without exceeding a normal output upper limit value for the motor generator while continuing to control the output of the engine to be less than or equal to the limited upper limit value or continuing to control the engine to be in the idling state.

14. The shovel according to claim 13, wherein the control device calculates a charge rate of the power storage device and refrains from operating the motor generator even when the forced assist switch is turned on when the charge rate is lower than an assist-enabling threshold value.

15. A method for controlling a shovel including
a lower running body;
an upper turning body pivotally mounted on the lower running body;
an engine mounted on the upper turning body;
a motor generator driven by the engine;
a power storage device for storing electric power generated by the motor generator;
an electric motor for supplying regenerative electric power to the power storage device;
a selective reduction catalyst system for purifying exhaust gas by injecting a reducing agent stored in a reducing agent storage tank into an exhaust pipe of the engine;
an abnormality detection unit for detecting an abnormality of the selective reduction catalyst system; and
a control device that performs abnormality determination on the selective reduction catalyst system based on comparison of a detection result of the abnormality detection unit against one or more predetermined threshold values;
the method comprising a step of the control device continuing to control the electric motor before and after the abnormality determination.

* * * * *